(12) United States Patent
Satoh et al.

(10) Patent No.: US 10,724,917 B2
(45) Date of Patent: Jul. 28, 2020

(54) PRESSURE DETECTION DEVICE, INTERNAL COMBUSTION ENGINE EQUIPPED WITH THE SAME, AND METHOD FOR MANUFACTURING THE SAME

(71) Applicants: CITIZEN FINEDEVICE CO., LTD., Minamitsuru-gun, Yamanashi (JP); TOYOTA JIDOSHA KABUSHIKI KAISHA, Toyota-shi, Aichi-ken (JP); CITIZEN WATCH CO., LTD., Nishitokyo-shi, Tokyo (JP)

(72) Inventors: Yusuke Satoh, Minamitsuru-gun (JP); Kazuo Takahashi, Minamitsuru-gun (JP); Aki Sudo, Minamitsuru-gun (JP); Keisuke Sasaki, Toyota (JP); Masakatsu Nagai, Toyota (JP)

(73) Assignees: CITIZEN FINEDEVICE CO., LTD., Yamanashi (JP); TOYOTA JIDOSHA KABUSHIKI KAISHA, Toyota (JP); CITIZEN WATCH CO., LTD., Tokyo (JP)

(*) Notice: Subject to any disclaimer, the term of this patent is extended or adjusted under 35 U.S.C. 154(b) by 188 days.

(21) Appl. No.: 15/711,321

(22) Filed: Sep. 21, 2017

(65) Prior Publication Data
US 2018/0087993 A1 Mar. 29, 2018

(30) Foreign Application Priority Data
Sep. 27, 2016 (JP) ................................. 2016-187827

(51) Int. Cl.
*G01L 23/10* (2006.01)
*G01L 23/22* (2006.01)

(52) U.S. Cl.
CPC ............ *G01L 23/10* (2013.01); *G01L 23/222* (2013.01)

(58) Field of Classification Search
CPC .............................. G01L 23/10; G01L 23/222
USPC ........................................................ 73/35.13
See application file for complete search history.

(56) References Cited

U.S. PATENT DOCUMENTS

| 5,517,073 A * | 5/1996 | Ohkuma ................. G01D 3/036 |
| | | 310/315 |
| 2005/0155432 A1* | 7/2005 | Katayama ............. G01L 19/143 |
| | | 73/729.2 |
| 2015/0034039 A1* | 2/2015 | Takahashi ............... G01L 23/22 |
| | | 123/193.5 |

(Continued)

FOREIGN PATENT DOCUMENTS

JP 2013-156171 A 8/2013

*Primary Examiner* — Tarun Sinha
(74) *Attorney, Agent, or Firm* — Oliff PLC

(57) ABSTRACT

A pressure detection device includes: a cylindrical body made of a conductor; a pressure receiver made of a conductor, the pressure receiver being mounted to one end side of the body and receiving pressure from the outside; a signal generator arranged inside the body, the signal generator being electrically connected to the pressure receiver and generating a signal corresponding to the pressure received by the pressure receiver; and a cover made of an insulator with a lower thermal conductivity than thermal conductivities of the body and the pressure receiver, the cover continuously covering an outer surface of the pressure receiver and a portion of an outer surface of the body, the portion being located at a side closer to the pressure receiver.

14 Claims, 11 Drawing Sheets

(56) References Cited

U.S. PATENT DOCUMENTS

2017/0343437 A1* 11/2017 Ura .......................... G01L 7/022

* cited by examiner

FIG.9A EXAMPLE 1
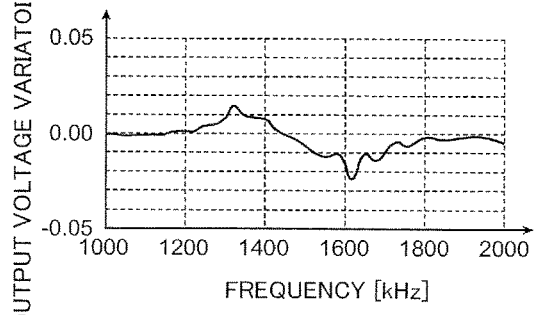
FIG.9E EXAMPLE 5
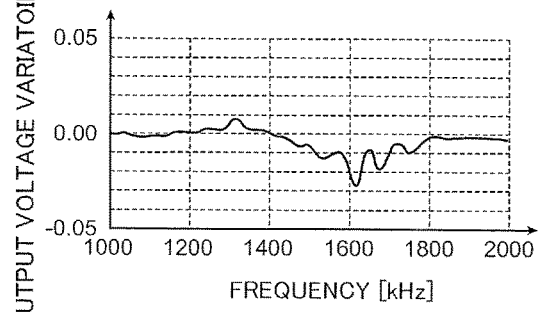
FIG.9B EXAMPLE 2
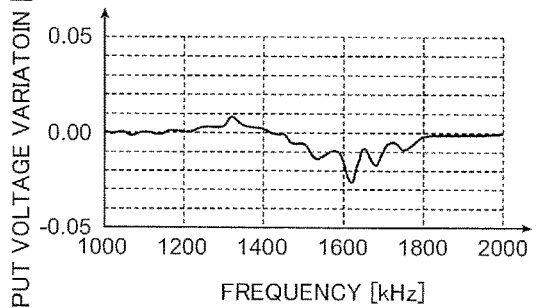
FIG.9F EXAMPLE 6
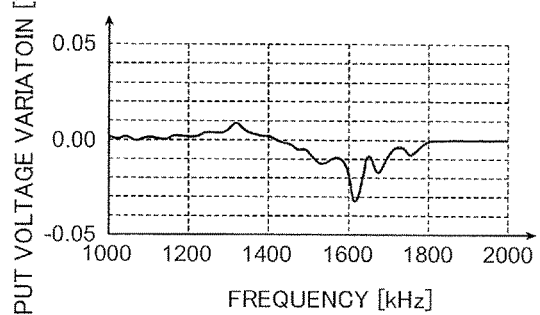
FIG.9C EXAMPLE 3
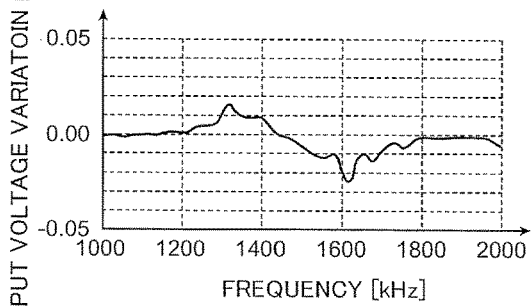
FIG.9G EXAMPLE 7
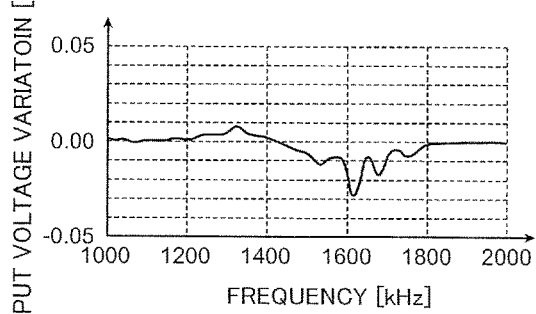
FIG.9D EXAMPLE 4
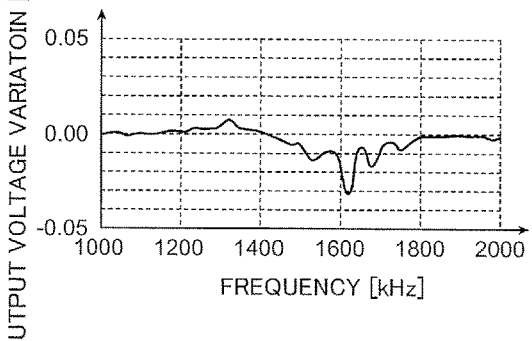

FIG.10A EXAMPLE 8
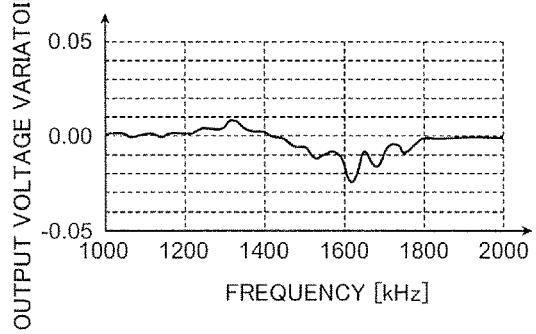
FIG.10E EXAMPLE 12
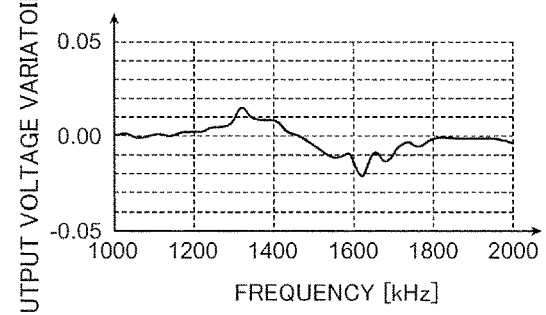
FIG.10B EXAMPLE 9
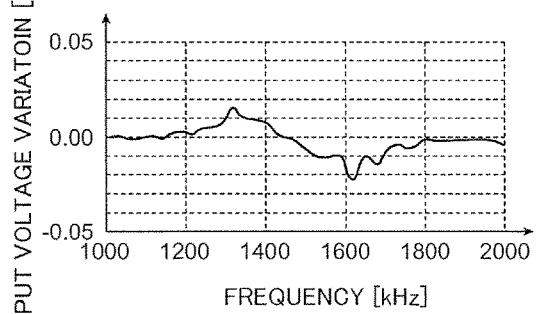
FIG.10F EXAMPLE 13
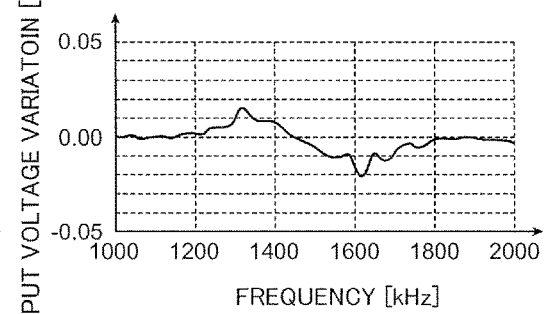
FIG.10C EXAMPLE 10
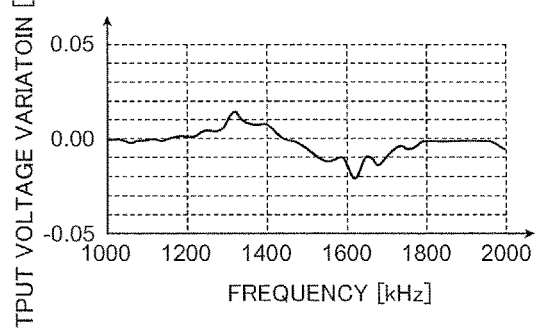
FIG.10G EXAMPLE 14
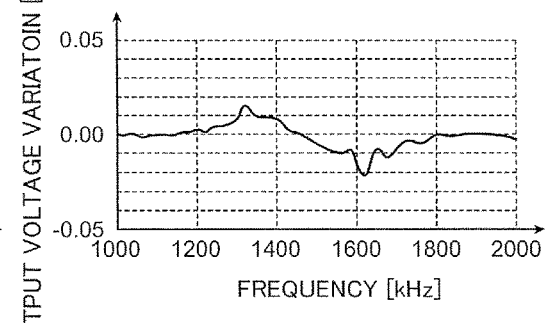
FIG.10D EXAMPLE 11
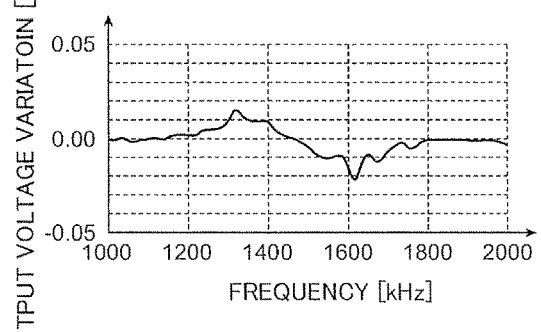

FIG.11A EXAMPLE 15
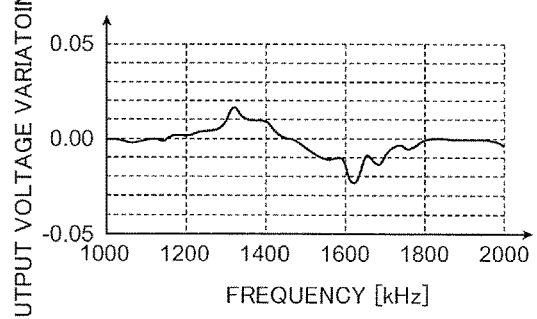
FIG.11E EXAMPLE 19
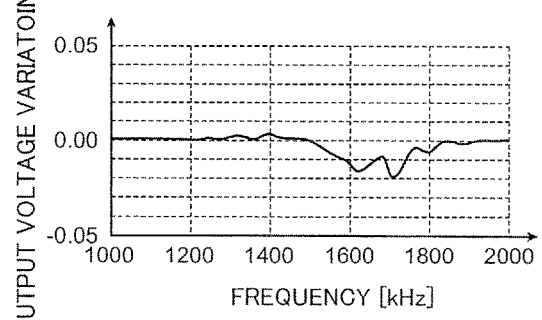
FIG.11B EXAMPLE 16
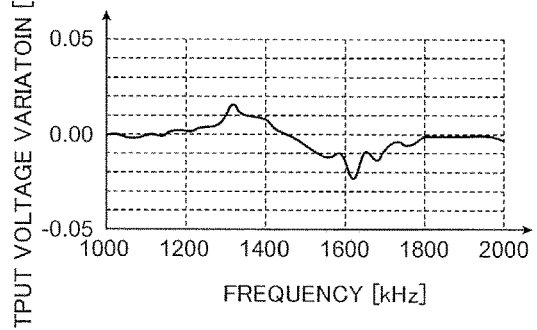
FIG.11F EXAMPLE 20
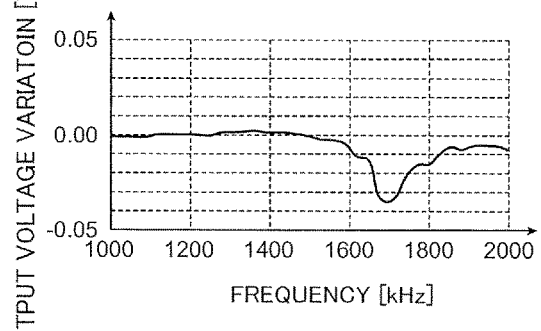
FIG.11C EXAMPLE 17
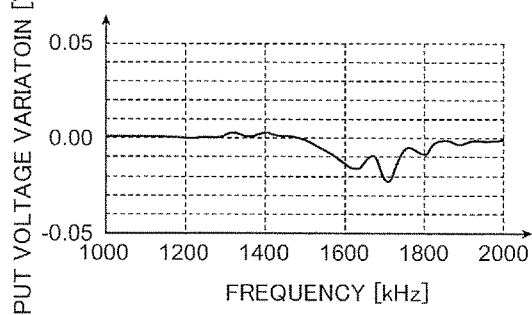
FIG.11G COMPARATIVE EXAMPLE
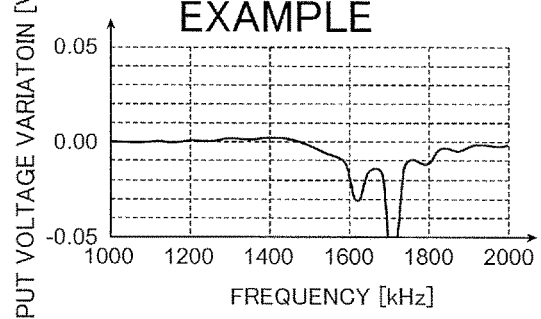
FIG.11D EXAMPLE 18
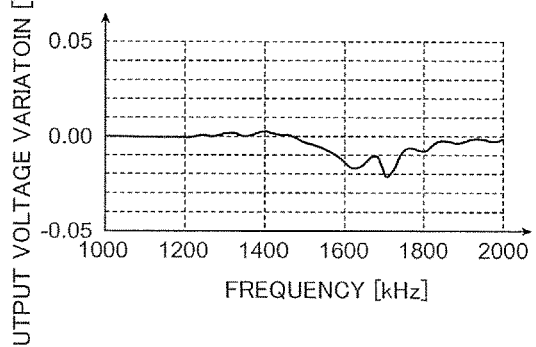

PRESSURE DETECTION DEVICE, INTERNAL COMBUSTION ENGINE EQUIPPED WITH THE SAME, AND METHOD FOR MANUFACTURING THE SAME

CROSS REFERENCE TO RELATED APPLICATIONS

This application is based on and claims priority under 35 USC § 119 from Japanese Patent Application No. 2016-187827 filed Sep. 27, 2016.

BACKGROUND

Technical Field

The present invention relates to a pressure detection device, an internal combustion engine equipped with the same, and a method for manufacturing the same.

Related Art

A pressure detection device that uses a signal generator such as a piezoelectric element has been proposed as a pressure detection device to detect pressure inside a combustion chamber of an internal combustion engine and the like.

Japanese Patent Application Laid-Open Publication No. 2013-156171 discloses a pressure detection device including: a metal cylindrical housing (a case body); a metal diaphragm head (a pressure receiver) mounted to the front end side of the case body to receive pressure from the outside; and a piezoelectric element (a signal generator) arranged inside the case body on the rear end side of the pressure receiver to detect pressure acting through the pressure receiver, wherein the ground of the signal generator and the case body are electrically connected through the pressure receiver. The document also discloses that this pressure detection device is inserted into a communication hole provided in a cylinder head of an internal combustion engine to electrically connect the case body and the cylinder head, and that the pressure receiver is arranged so as to face a combustion chamber. It also discloses that the cylinder head functions as a grounding body, and the ground of the signal generator is grounded through the pressure receiver, the case body and the cylinder head.

SUMMARY

If the pressure detection device is configured such that the case body (a conductor) electrically connected to the ground of the signal generator is mounted to a mounting body made of a conductor (e.g. the cylinder head) to make the case body electrically continuous with the mounting body, which is then grounded, such a configuration may cause a noise to enter the pressure detection device from the mounting body through the case body. This noise may cause an error in the pressure that is obtained based on an output from the signal generator.

Also, if the pressure detection device is configured such that the pressure received by the pressure receiver is transmitted to the signal generator, a heat applied to the pressure receiver along with the pressure may cause the pressure receiver to deform due to thermal expansion, and this results in the pressure transmitted from the pressure receiver to the signal generator increasing or decreasing from the original pressure that should be transmitted. This in turn causes an output value generated by the signal generator to increase or decrease from the proper value that should be output, and as a result the pressure obtained based on the output from the signal generator may contain an error.

An object of the present invention is to reduce errors in output values due to a noise from the outside, and to reduce errors in output values due to thermal expansion of the pressure receiver that receives pressure.

According to a first aspect of the present invention, there is provided a pressure detection device including: a cylindrical body made of a conductor; a pressure receiver made of a conductor, the pressure receiver being mounted to one end side of the body and receiving pressure from the outside; a signal generator arranged inside the body, the signal generator being electrically connected to the pressure receiver and generating a signal corresponding to the pressure received by the pressure receiver; and a cover made of an insulator with a lower thermal conductivity than thermal conductivities of the body and the pressure receiver, the cover continuously covering an outer surface of the pressure receiver and a portion of an outer surface of the body, the portion being located at a side closer to the pressure receiver.

According to a second aspect of the present invention, in the first aspect of the pressure detection device, the cover includes a first cover layer and a second cover layer, the first cover layer being arranged on the body and the pressure receiver, the second cover layer being arranged on the first cover layer and having a higher porosity than a porosity of the first cover layer.

According to a third aspect of the present invention, in the second aspect of the pressure detection device, the cover further includes a third cover layer arranged on the second cover layer, the third cover layer having a lower porosity than the porosity of the second cover layer.

According to a fourth aspect of the present invention, there is provided an internal combustion engine equipped with a pressure detection device, including: a cylinder head having a communication hole, the communication hole communicating a combustion chamber with the outside of the combustion chamber, the combustion chamber being located at one end side, the outside of the combustion chamber being located at the other end side; and a pressure detection device inserted into the communication hole to be mounted to the cylinder head, the pressure detection device detecting pressure inside the combustion chamber, wherein the pressure detection device includes: a cylindrical body made of a conductor, the body being arranged so as to be present inside and outside of the communication hole; a pressure receiver made of a conductor, the pressure receiver being mounted to the one end side of the body and receiving pressure from the combustion chamber; a signal generator arranged inside the body, the signal generator being electrically connected to the pressure receiver and generating a signal corresponding to the pressure received by the pressure receiver; and a cover made of an insulator with a lower thermal conductivity than thermal conductivities of the body and the pressure receiver, the cover continuously covering an outer surface of the pressure receiver and a portion of an outer surface of the body, the portion being located inside the communication hole.

According to a fifth aspect of the present invention, there is provided a method for manufacturing a pressure detection device including: mounting a pressure receiver to one end side of an cylindrical body so as to electrically connect the pressure receiver and the body, the pressure receiver and the body each being made of a conductor, the pressure receiver receiving pressure from the outside; forming a cover on outer surfaces of the body and the pressure receiver by an aerosol deposition method, the cover being made of an inorganic insulator; and mounting a signal generator inside the body so as to electrically connect the signal generator and the pressure receiver, the signal generator generating a signal corresponding to the pressure received by the pressure receiver.

According to the present invention, it is possible to reduce errors in output values due to a noise from the outside, and to reduce errors in output values due to thermal expansion of the pressure receiver that receives pressure.

BRIEF DESCRIPTION OF THE DRAWINGS

An exemplary embodiment of the present invention will be described in detail based on the following figures, wherein:

FIGS. 9A-9G show results of the antenna irradiation test;

FIGS. 10A-10G show results of the antenna irradiation test (continued); and

FIGS. 11A-11G show results of the antenna irradiation test (continued).

DETAILED DESCRIPTION

Hereinafter, the exemplary embodiment of the present invention will be described in detail with reference to attached drawings.

[Configuration of the Pressure Detection System]

Figure 1:
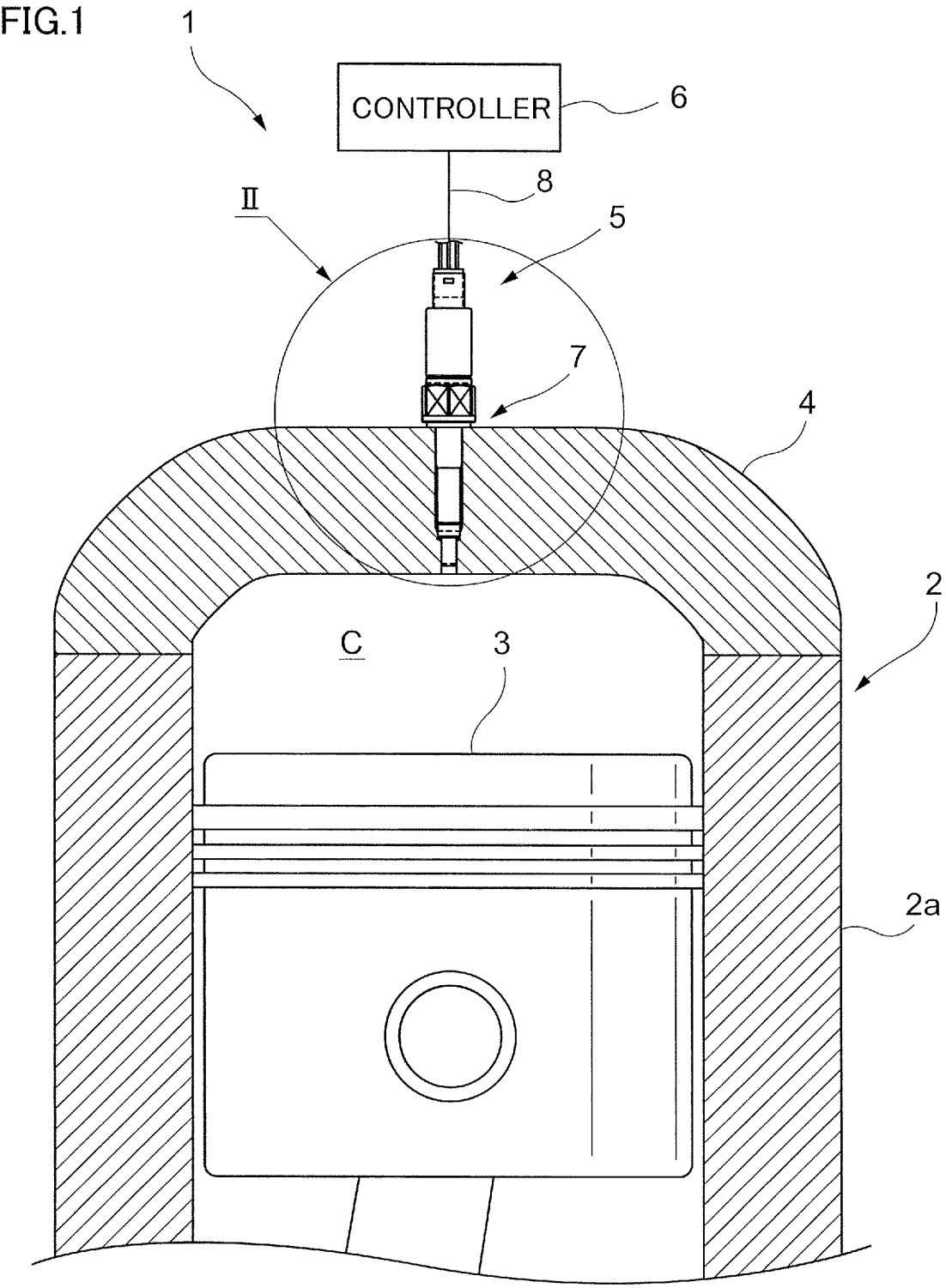
FIG. 1 illustrates a schematic configuration of a pressure detection system according to the exemplary embodiment.

FIG. 1 illustrates a schematic configuration of a pressure detection system according to the exemplary embodiment.

Figure 2:
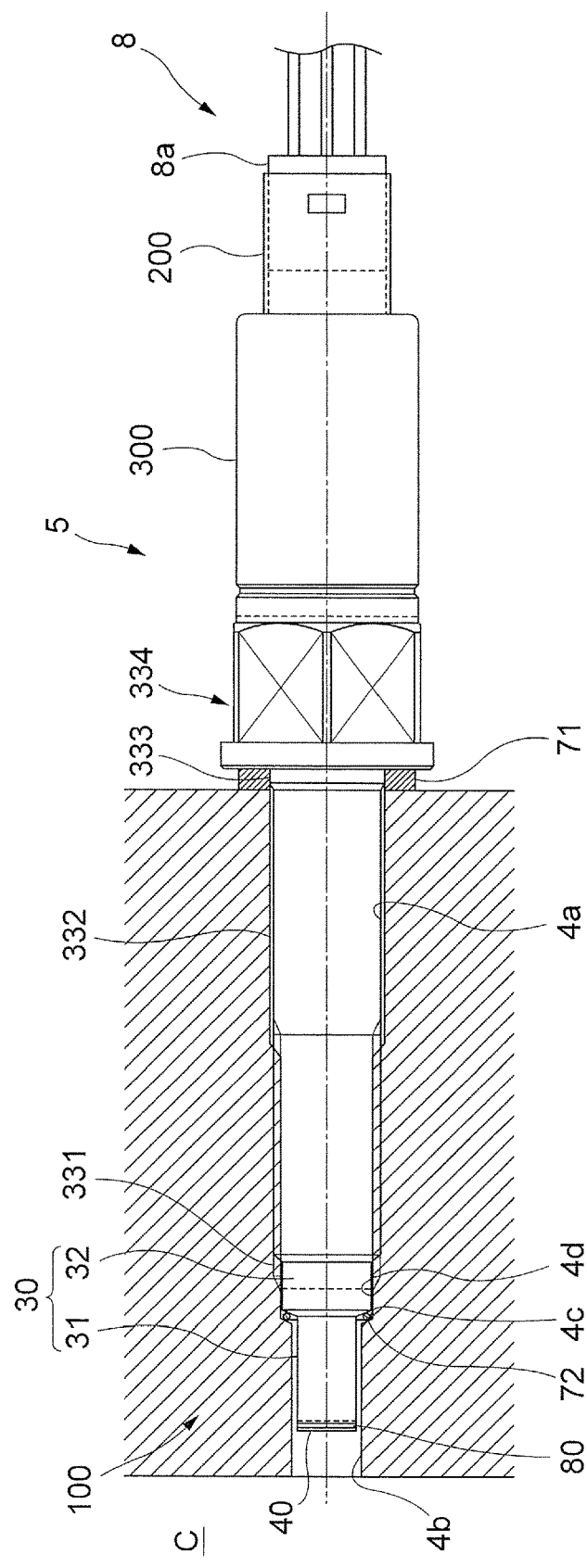
FIG. 2 is an enlarged view of the part II in FIG. 1.

FIG. 2 is an enlarged view of the part II in FIG. 1.

The pressure detection system includes a pressure detection device 5, a controller 6, and a transmission cable 8. The pressure detection device 5 detects pressure (combustion pressure) inside a combustion chamber C of an internal combustion engine 1. The controller 6 supplies power to the pressure detection device 5 and controls the operation of the internal combustion engine 1 based on the pressure detected by the pressure detection device 5. The transmission cable 8 electrically connects the pressure detection device 5 and the controller 6 to transmit electric signals.

The internal combustion engine 1, which is the target whose pressure is to be detected, includes: a cylinder block 2 having a cylinder 2a inside thereof; a piston 3 reciprocating in the cylinder 2a; and a cylinder head 4 fastened to the cylinder block 2 to form the combustion chamber C with the piston 3 and other components. Further, the cylinder head 4 has a communication hole 4a that communicates the combustion chamber C with the outside. The communication 4a includes a first hole portion 4b, an inclined portion 4c, and a second hole portion 4d in this order from the combustion chamber C side. The inclined portion 4c has a diameter gradually increasing from the hole diameter of the first hole portion 4b. The second hole portion 4d has a larger hole diameter than the hole diameter of the first hole portion 4b. In the exemplary embodiment, the cylinder block 2 and the cylinder head 4 are made of a conductive metal material (such as cast iron and aluminum). For this reason, the metal is exposed on an inner surface of the communication hole 4a of the cylinder head 4.

[Pressure Detection Device]

Detailed explanation of the pressure detection device 5 will be given below.

Figure 3:
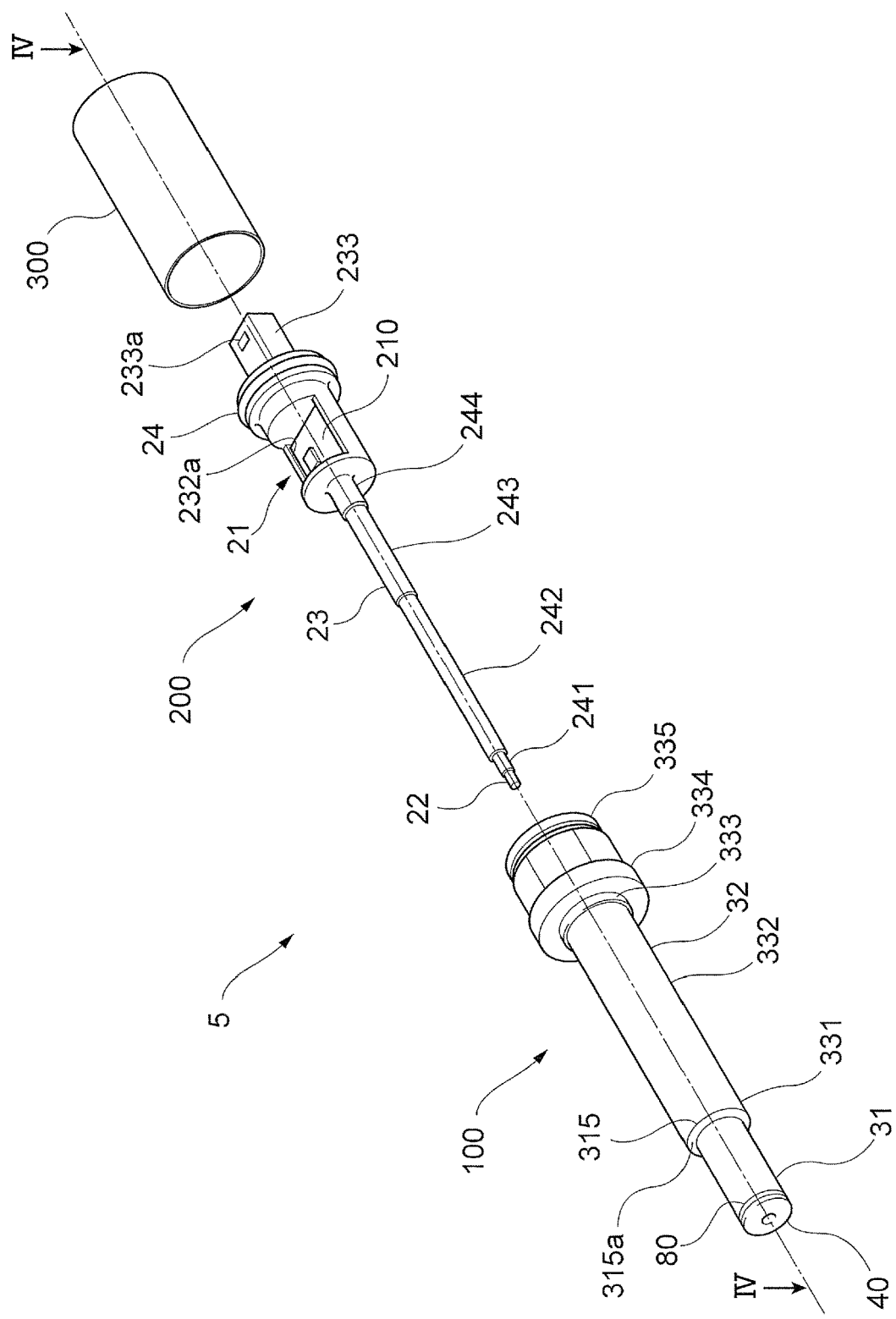
FIG. 3 illustrates a schematic configuration of a pressure detection device.
Figure 4:
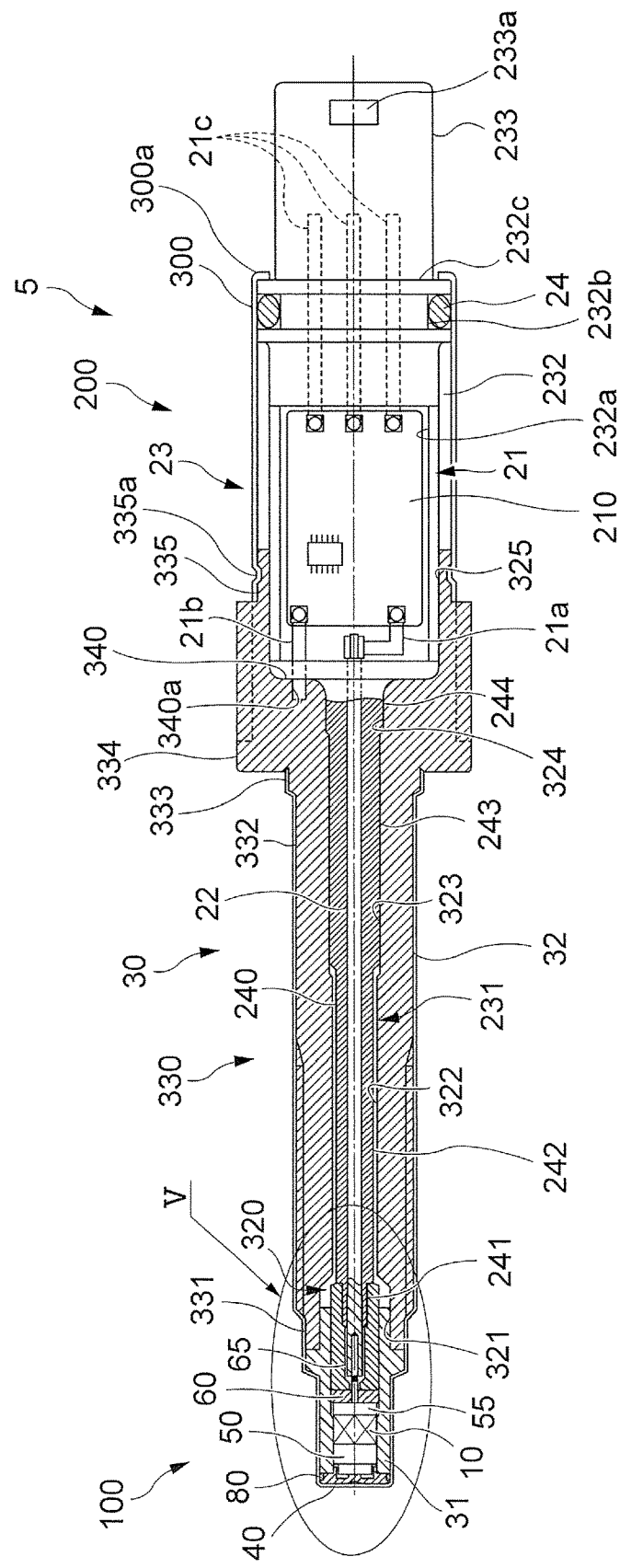
FIG. 4 is a cross-sectional view taken along the line IV-IV in FIG. 3.
Figure 5:
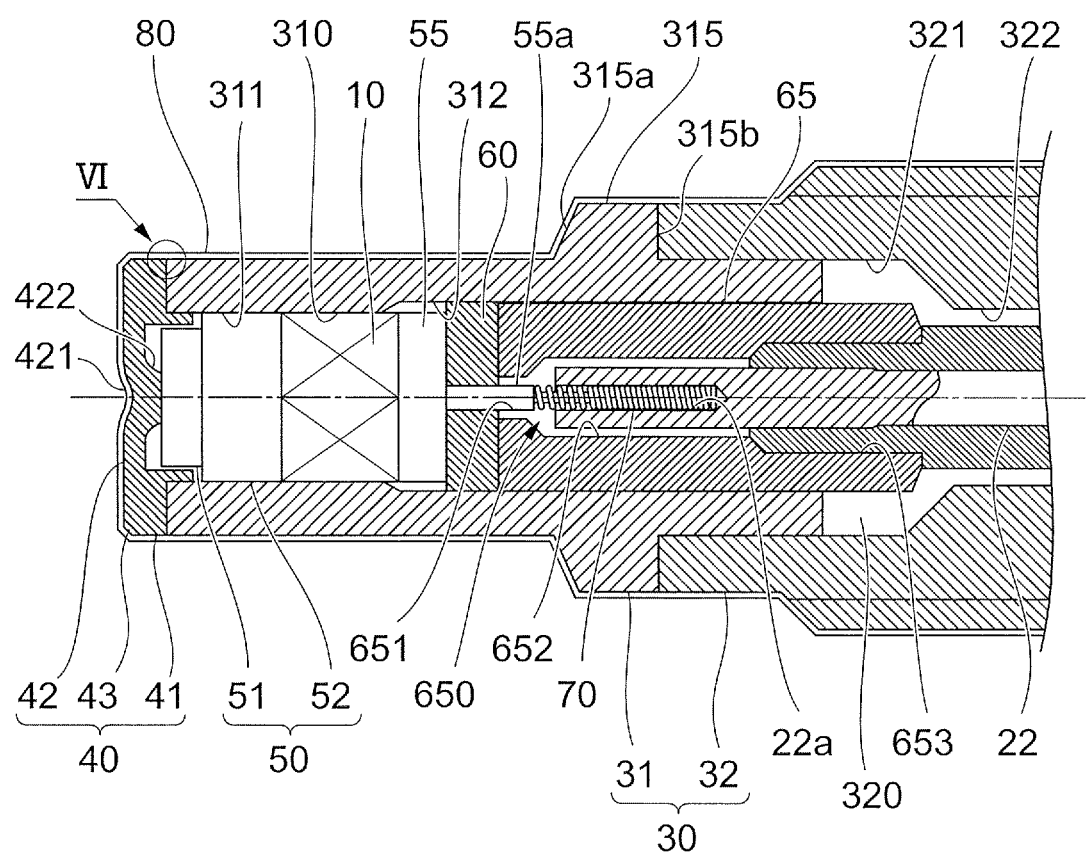
FIG. 5 is an enlarged view of the part V in FIG. 4.
Figure 6:
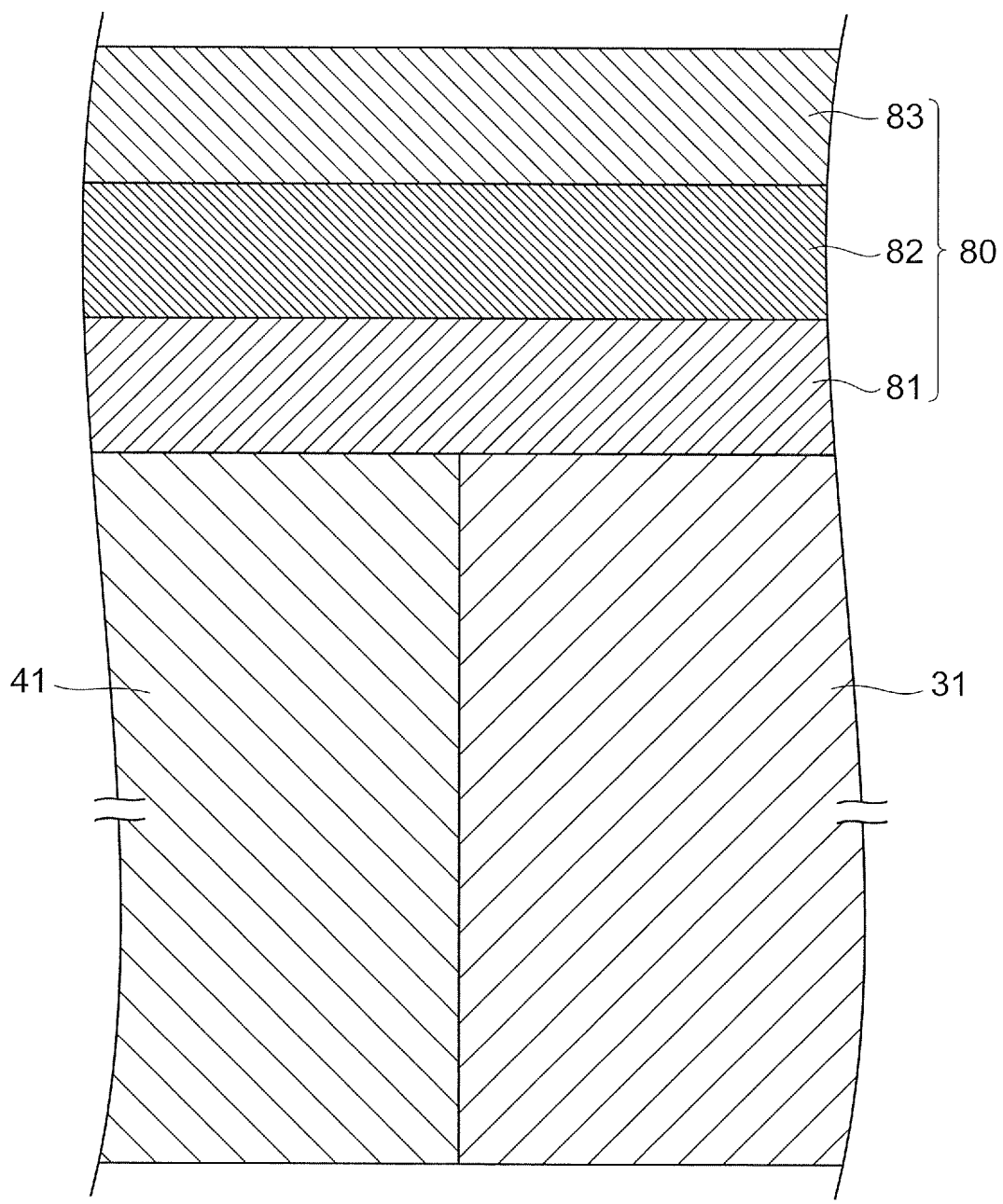
FIG. 6 is an enlarged view of the part VI in FIG. 5.

FIG. 3 illustrates a schematic configuration of the pressure detection device 5. FIG. 4 is a cross-sectional view taken along the line IV-IV in FIG. 3. FIG. 5 is an enlarged view of the part V in FIG. 4. FIG. 6 is an enlarged view of the part VI in FIG. 5.

The pressure detection device 5 includes a sensor part 100, a signal processor 200, and a holding member 300. The sensor part 100 includes a piezoelectric element 10 that converts pressure inside the combustion chamber C into electric signals. The signal processor 200 processes the electric signals from the sensor part 100. The holding member 300 holds the signal processor 200. In mounting the pressure detection device 5 to the cylinder head 4, the pressure detection device 5 is inserted into the communication hole 4a of the cylinder head 4 with a diaphragm head 40 (described later) of the sensor part 100 first. In the following explanation, the left side of FIG. 4 is referred to as a front end side (or one end side) of the pressure detection device 5, and the right side of FIG. 4 is referred to as a rear end side (or the other end side) of the pressure detection device 5.

(Sensor Part)

First, the sensor part 100 will be explained.

The sensor part 100 includes the piezoelectric element 10 that converts applied pressure into electric signals, and a cylindrical housing 30 in which a columnar hole for housing the piezoelectric element 10 and other components is formed. Hereinafter, the direction of the centerline of the columnar hole formed in the housing 30 is simply referred to as a centerline direction.

The sensor part 100 further includes the diaphragm head 40, a first electrode 50, and a second electrode 55. The diaphragm head 40 is arranged so as to close an opening of the housing 30 at the front end side, and the pressure inside the combustion chamber C acts on this diaphragm head 40. The first electrode 50 is arranged between the diaphragm head 40 and the piezoelectric element 10. The second electrode 55 is arranged opposite to the first electrode 50 across the piezoelectric element 10.

The sensor part 100 further includes an insulating ring 60, a supporting member 65, a coil spring 70, and an insulating layer 80. The insulating ring 60 electrically insulates the second electrode 55. The supporting member 65 is arranged at the rear end side relative to the insulating ring 60 and supports an end portion of a cover member 23 (described later) of the signal processor 200. The coil spring 70 is present between the second electrode 55 and a conducting member 70 (described later). The insulating layer 80 is composed of a film of an insulator, and continuously covers the outer surface of the diaphragm head 40 and the outer surface at the front end side of the housing 30.

The piezoelectric element 10, which is a specific example of the claimed signal generator, includes a piezoelectric body exhibiting a piezoelectric function having a piezoelectric longitudinal effect. The piezoelectric longitudinal effect refers to a function in which electric charges are generated on the surface of the piezoelectric body in an electric charge generation axis direction when external force acts on a stress application axis that is the same direction as the electric charge generation axis direction of the piezoelectric body. The piezoelectric element 10 of the exemplary embodiment is accommodated in the housing 30 so that the centerline direction corresponds to the direction of the stress application axis. Here, the piezoelectric element 10 is arranged with a gap formed between the side surface of the piezoelectric element 10 and an inner wall of the housing 30 so that the piezoelectric element 10 and the housing 30 do not contact each other.

Next, an example is given where a piezoelectric transversal effect is utilized for the piezoelectric element 10. The piezoelectric transversal effect refers to a function in which electric charges are generated on the surface of the piezoelectric body in the electric charge generation axis direction when external force acts on a stress application axis that is perpendicular to the electric charge generation axis of the piezoelectric body. The piezoelectric element 10 may be composed of a stack of multiple piezoelectric bodies each formed in a thin plate shape. Such a stacked structure allows to efficiently collect electric charges generated on the piezoelectric bodies and thus to improve the sensitivity of the sensor. Examples of piezoelectric single crystals include langasite-based crystals (langasite, langatate, langanite, LGTA), quartz, gallium phosphate and the like having the piezoelectric longitudinal effect and the piezoelectric transversal effect. In the exemplary embodiment, the piezoelectric element 10 uses a langatate single crystal as the piezoelectric body.

The housing 30, which is a specific example of the claimed body, includes a first housing 31 at the front end side, and a second housing 32 at the rear end side.

The first housing 31 is a thin-walled cylindrical member in which a columnar hole 310 is formed. The diameter of the hole 310 changes stepwise from the front end side to the rear end side. At a central part of the outer surface of the first housing 31 in the centerline direction, a protrusion 315 protruding from the outer surface is provided along the entire circumference.

The hole 310 includes a first hole 311 and a second hole 312 in this order from the front end side to the rear end side. The second hole 312 has a larger hole diameter than the hole diameter of the first hole 311. The protrusion 315 includes an inclined surface 315a at the front end side and a vertical surface 315b at the rear end side. The inclined surface 315a has a diameter gradually increasing from the front end side toward the rear end side. The vertical surface 315b is perpendicular to the centerline direction.

The second housing 32 is a cylindrical member in which a columnar hole 320 is formed. The diameter of the hole 320 changes stepwise from the front end side to the rear end side. The second housing 32 has an outer surface 330 with a diameter changing stepwise from the front end side to the rear end side.

The hole 320 includes a first hole 321, a second hole 322, a third hole 323, a fourth hole 324, and a fifth hole 325 in this order from the front end side to the rear end side. The second hole 322 has a smaller hole diameter than the hole diameter of the first hole 321. The third hole 323 has a larger hole diameter than the hole diameter of the second hole 322. The fourth hole 324 has a larger hole diameter than the hole diameter of the third hole 323. The fifth hole 325 has a larger hole diameter than the hole diameter of the fourth hole 324.

The hole diameter of the first hole 321 is set equal to or smaller than the diameter of the outer surface of the first housing 31 so that the front end portion of the second housing 32 is tightly fitted with (pressed into) the rear end portion of the first housing 31.

The outer surface 330 includes a first outer surface 331, a second outer surface 332, a third outer surface 333, a fourth outer surface 334, and a fifth outer surface 335 from the front end side to the rear end side. The second outer surface 332 has a larger outer diameter than the outer diameter of the first outer surface 331. The third outer surface 333 has a larger outer diameter than the outer diameter of the second outer surface 332. The fourth outer surface 334 has a larger outer diameter than the outer diameter of the third outer surface 333. The fifth outer surface 335 has a smaller outer diameter than the outer diameter of the fourth outer surface 334. A first seal member 71 (described later) is loosely fitted over the third outer surface 333, and dimensional tolerance between the outer diameter of the third outer surface 333 and the inner diameter of the first seal member 71 is set at 0 to 0.2 mm, for example. The rear end portion of the fourth outer surface 334 is shaped to be a regular hexagonal prism with six chamfers at equal intervals in the circumferential direction. At a central part of the fifth outer surface 335 in the centerline direction, a recess 335a recessed from the outer surface is formed along the entire circumference.

Further, the second housing 32 includes an abutting surface 340 at a part transitioning from the fourth hole 324 to the fifth hole 325, namely at the front end of the hole 325. The abutting surface 340 is abutted by the front end surface of a board cover portion 232 (described later) of the cover member 23 of the signal processor 200. The abutting surface 340 includes a pin-insertion recess 340a into which a second connecting pin 21b (described later) of a printed wiring board 210 of the signal processor 200 is inserted.

Since the first housing 31 and the second housing 32 are located close to the combustion chamber C, materials of these components are desirably those that can withstand an operating temperature environment of at least −40° C. to 350° C. Specifically, a high heat-resistant stainless steel such as SUS 630, SUS 316 and SUS 430 of the JIS standard is desirably used.

The diaphragm head 40, which is a specific example of the pressure receiver, includes a cylindrical portion 41 of a cylindrical shape, and a closing portion 42 of a plate shape that is arranged at the front end of the cylindrical portion 41 to close the front end of the cylindrical portion 41. The diaphragm head 40 further includes a chamfered portion 43 that is formed by chamfering, at 45 degrees, the outer surface at the corner of the cylindrical portion 41 and the closing portion 42. Since the diaphragm head 40 is located in the combustion chamber C under high temperature and high pressure, the material of the diaphragm head 40 is desirably an alloy that has high elasticity and is excellent in durability, heat resistance and corrosion resistance. For example, SUH 660 may be used.

The closing portion 42 includes a front surface recess 421 and a rear surface protrusion 422. The front surface recess 421 is provided at the central part of the front end side, namely the front surface, of the closing portion 42 and recessed toward the piezoelectric element 10. The rear surface protrusion 422 is provided at the central part of the rear end side, namely the rear surface, of the closing portion 42 and protrudes toward the piezoelectric element 10. The rear surface protrusion 422 is located on the back of the front surface recess 421.

The first electrode 50 is a columnar member with a diameter changing stepwise from the front end side to the rear end side. The first electrode 50 includes a first columnar portion 51 and a second columnar portion 52 with a larger outer diameter than the outer diameter of the first columnar portion 51. The outer diameter of the first columnar portion 51 is smaller than the inner diameter of the cylindrical portion 41 of the diaphragm head 40. The outer diameter of the second columnar portion 52 is substantially the same as the hole diameter of the first hole 311 of the first housing 31. The first columnar portion 51 is arranged such that its front end surface contacts the rear side protrusion 422 of the closing portion 42 of the diaphragm head 40. The second columnar portion 52 is arranged such that its rear end surface contacts the front end surface of the piezoelectric element 10. The front end of the piezoelectric element 10 is electrically connected to the housing 30 through the contact between the outer surface of the second columnar portion 52 and the inner surface of the first housing 31 and/or the contact between the front end surface of the first columnar portion 51 and the diaphragm head 40.

The first electrode 50 is used for applying the pressure inside the combustion chamber C to the piezoelectric element 10, and is sized to allow the rear end surface of the second columnar portion 52, which is the surface on the side of the piezoelectric element 10, to push the entire end surface of the piezoelectric element 10. Moreover, both end surfaces of the first electrode 50 in the centerline direction are formed to be parallel to each other (perpendicular to the centerline direction) and to have smooth surfaces so that the pressure received from the diaphragm head 40 equally acts on the piezoelectric element 10.

Examples of materials for the first electrode 50 include stainless steel.

The second electrode 55 is a columnar member. The second electrode 55 is arranged such that its front end surface contacts the rear end surface of the piezoelectric element 10 and its rear end surface contacts the insulating ring 60. At the rear end surface of the second electrode 55, a columnar protrusion 55*a* protruding from the rear end surface toward the rear end side is provided. The protrusion 55*a* includes a base portion at the end surface side, and a tip end with a smaller outer diameter than the outer diameter of the base portion. The outer diameter of the protrusion 55*a* is set smaller than the inner diameter of the insulating ring 60. The length of the protrusion 55*a* is set longer than the width (length in the centerline direction) of the insulating ring 60, so that the tip end of the protrusion 55*a* is exposed from the insulating ring 60. The second electrode 55 is a member for applying a certain load to the piezoelectric element 10 between the second electrode 55 and the first electrode 50. The end surface of the second electrode 55 at the side of the piezoelectric element 10 is sized to allow the end surface to push the entire end surface of the piezoelectric element 10. The end surface of the second electrode 55 is further formed to be parallel to the end surface of the piezoelectric element 10 and to have a smooth surface. The outer diameter of the second electrode 55 is set smaller than the hole diameter of the second hole 312 of the first housing 31, forming a gap between the outer surface of the second electrode 55 and the inner surface of the first housing 31.

Examples of materials for the second electrode 55 include stainless steel.

The insulating ring 60 is a cylindrical member made of alumina ceramics or the like. The inner diameter (hole diameter at the central part) of the insulating ring 60 is set slightly larger than the outer diameter of the base portion of the protrusion 55*a* of the second electrode 55. The outer diameter of the insulating ring 60 is set substantially the same as the hole diameter of the second hole 312 of the first housing 31. The second electrode 55 is arranged with its protrusion 55*a* inserted into the hole at the central part of the insulating ring 60. This aligns the center position of the second electrode 55 with the center of the second hole 312 of the first housing 31.

The supporting member 65 is a cylindrical member that has a single outer surface and internally has plural columnar holes 650 with different diameters from the front end side to the rear end side.

The holes 650 consists of a first hole 651, a second hole 652, and a third hole 653 in this order from the front end side to the rear end side. The second hole 652 has a larger hole diameter than the hole diameter of the first hole 651, and the third hole 653 has a larger hole diameter than the hole diameter of the second hole 652. The hole diameter of the first hole 651 is larger than the hole diameter of the base portion of the protrusion 55*a* of the second electrode 55, and the protrusion 55*a* is exposed inside the supporting member 65. The hole diameter of the second hole 652 is larger than the outer diameter of the front end of a conducting member 22 (described later) of the signal processor 200. The hole diameter of the third hole 653 is smaller than the outer diameter of the end portion of the cover member 23 (described later) of the signal processor 200, and the cover member 23 is tightly fitted into a surrounding wall of the third hole 653. The supporting member 65 thus functions to support the end portion of the cover member 23.

The coil spring 70 has an inner diameter equal to or larger than the outer diameter of the tip end of the protrusion 55*a* of the second electrode 55 and smaller than the outer diameter of the base portion of the protrusion 55*a*, and has an outer diameter smaller than the diameter of an insertion hole 22 of the conducting member 22 (described later). With the tip end of the protrusion 55*a* of the second electrode 55 inserted inside the coil spring 70, the coil spring 70 is inserted into the insertion hole 22*a* of the conducting member 22 (described later). The length of the coil spring 70 is set at a length that allows the coil spring 70 to be present in a compressed state between the second electrode 55 and the conducting member 22. The material of the coil spring 70 is preferably an alloy that has high elasticity and is excellent in durability, heat resistance, corrosion resistance and the like. Additionally, the surface of the coil spring 70 is preferably plated with gold to increase its electric conductivity.

The insulating layer 80, which is a specific example of the claimed cover, is made of an insulating material with a low thermal conductivity. The insulating layer 80 continuously covers the entire area of an outer exposed surface of the diaphragm head 40, the entire area of an outer exposed surface of the first housing 31, and a part of an outer exposed surface of the second housing 32 at the front end side (namely the first outer surface 331, the second outer surface 332, and the third outer surface 333, excluding the fourth outer surface 334 and the fifth outer surface 335, which are relatively on the rear end side).

The material of the insulating layer 80 may be organic or inorganic as long as the material is an insulating material. The inorganic material of the insulating layer 80 is preferably ceramics (including amorphous ceramics), which are excellent in durability, heat resistance, corrosion resistance and the like. Examples include zirconia, alumina, silica and diamond like-carbon (DLC). Other oxide ceramics, nitride ceramics or carbide ceramics may also be used. Meanwhile, examples of organic materials for the insulating layer 80 include polyimide (PI), polytetrafluoroethylene (PTFE), and polyetheretherketone (PEEK).

In the exemplary embodiment, the insulating layer 80 is composed of a stack of multiple layers. More specifically, the insulating layer 80 of the exemplary embodiment includes a first insulating layer 81 (a specific example of the claimed first cover layer), a second insulating layer 82 (a specific example of the claimed second cover layer), and a third insulating layer 83 (a specific example of the claimed third cover layer). The first insulating layer 81 is formed on the outer surfaces of the components on which the insulating layer 80 is to be formed (i.e. the housing 30 and the diaphragm head 40). The second insulating layer 82 has different characteristics from the first insulating layer 81 and is formed on the first insulating layer 81. The third insulating layer 83 has different characteristics from the second insulating layer 82 and is formed on the second insulating layer 82. It should be noted that the first insulating layer 81 and the third insulating layer 83 may have the same characteristics.

Here, the phrase "different characteristics" indicates both of the case where the layers have different characteristics due to the use of different materials, and the case where the layers have different characteristics, despite the use of the same materials, due to difference in structures of the materials of respective layers. In the latter case, examples of such difference in structures include crystalline/amorphous, particle diameter and porosity.

In the exemplary embodiment, stabilized zirconia, which is obtained by adding a yttrium oxide as a stabilizer to zirconia, is used for the first insulating layer 81 to the third insulating layer 83 constituting the insulating layer 80. In the exemplary embodiment, the first insulating layer 81 and the third insulating layer 83 are formed of a film with a higher density than the second insulating layer 82 (the second insulating layer 82 is formed of a film with a lower density than the first insulating layer 81 and the third insulating layer 83).

Although the insulating layer 80 is composed of three layers in the exemplary embodiment, the insulating layer 80 may be composed of a single layer, two layers, or four or more layers.

Here, explanation will be given of a relationship of the insulating layer 80 with the housing 30 (the first housing 30 and the second housing 32) and the diaphragm head 40 used in the pressure detection device 5. Hereinafter, the housing 30 and the diaphragm head 40 are collectively referred to as the "housing unit".

The housing unit of the exemplary embodiment is made of a metal material (stainless steel in this specific example) as described above. On the other hand, the insulating layer 80 is made of an inorganic material (stabilized zirconia in this specific example) as described above. As a result, in the exemplary embodiment, the electric conductivity of the insulating layer 80 is lower than that of the housing unit.

Further, in the exemplary embodiment, materials of the insulating layer 80 and the housing unit are chosen such that the thermal conductivity of the insulating layer 80 is lower than that of the housing unit. In this specific example, the thermal conductivity of stabilized zirconia is 2-3 W/m·K while the thermal conductivity of stainless steel is 16-27 W/m·k.

Additionally, in the exemplary embodiment, materials of the insulating layer 80 and the housing unit are chosen such that the melting point of the insulating layer 80 is higher than that of the housing unit. In this specific example, the melting point of stabilized zirconia is 2715° C. while the melting point of stainless steel is 1400-1500° C.

Additionally, in the exemplary embodiment, materials of the insulating layer 80 and the housing unit are chosen such that the linear expansion coefficient of the insulating layer 80 is close to that of the housing unit. In this specific example, the linear expansion coefficient of stabilized zirconia is 10-11 ($10^{-6}$/K) while the linear expansion coefficient of stainless steel is 9-18 ($10^{-6}$/K).

(Signal Processor)

Next, description will be given of the signal processor 200.

The signal processor 200 includes a circuit board part 21, the rod-shaped conducting member 22, the cover member 23, and an O-ring 24. The circuit board part 21 performs at least amplification processing on electric signals that are weak electric charges obtained from the piezoelectric element 10 of the sensor part 100. The conducting member 22 guides the electric charges generated on the piezoelectric element 10 to the circuit board part 21. The cover member 23 covers the circuit board part 21, the conducting member 22 and the like. The O-ring 24 seals the circuit board part 21 and the like.

The circuit board part 21 includes the printed wiring board 210 on which electronic components constituting a circuit for amplifying the weak electric charges obtained from the piezoelectric element 10 of the sensor part 100 are mounted. The front end portion of the printed wiring board 210 is connected, by solder or other means, with a first connecting pin 21a for electrically connecting the rear end portion of the conducting member 22, and the second connecting pin 21b for grounding and positioning. Further, the rear end portion of the printed wiring board 210 is connected, by solder or other means, with three third connecting pins 21c that are electrically connected to the controller 6 via a connector 8a at the front end portion of the transmission cable 8. The three third connecting pins 21c are respectively used for supply of a power-supply voltage from the controller 6 to the printed wiring board 210, supply of a GND voltage from the controller 6 to the printed wiring board 210, and supply of an output voltage from the printed wiring board 210 to the controller 6.

The conducting member 22 is a rod-shaped (columnar) member, and has the insertion hole 22a at its front end into which the tip end of the protrusion 55a of the second electrode 55 is inserted. The rear end portion of the conducting member 22 is electrically connected to the printed wiring board 210 of the circuit board part 21 via a conductor wire. Examples of materials for the conducting member 22 include brass and beryllium copper. Among these, brass is preferred from the viewpoint of workability and cost. In contrast, beryllium copper is preferred from the viewpoint of electric conductivity, high temperature strength and reliability.

The cover member 23 includes a conducting member cover 231, the board cover 232, and a connector 233. The conducting member cover 231 covers the outer surface of the conducting member 22. The board cover 232 covers side and bottom surfaces of the printed wiring board 210 of the circuit board part 21. The connector 233 covers a periphery of the third connecting pins 21c connected to the printed wiring board 210. The connector 8a at the front end portion of the transmission cable 8 is fitted into this connector 233.

The conducting member cover 31 covers the conducting member 22 so as to expose the front end portion of the conducting member 22 in the centerline direction, and includes an outer surface 240 with a diameter changing stepwise from the front end side to the rear end side. The outer surface 240 includes: a first outer surface 241; a second outer surface 242 with a larger outer diameter than the outer diameter of the first outer surface 241; a third outer surface 243 with a larger outer diameter than the outer diameter of the second outer surface 242; and a fourth outer surface 244 with a larger outer diameter than the outer diameter of the third outer surface 243. The diameter of the first outer surface 241 is larger than the hole diameter of the third hole 653 of the supporting member 65, and the front end portion of the conducting member cover 231 is tightly fitted (pressed) into the surrounding wall of the third hole 653 of the supporting member 65. The diameter of the second outer surface 242 is smaller than the hole diameter of the second hole 322 of the second housing 32, and the diameter of the third outer surface 243 is smaller than the hole diameter of the third hole 323 of the second housing 32. The diameter of the fourth outer surface 244 is larger than the hole diameter of the fourth hole 324 of the second housing 32, and the rear end portion of the conducting member cover 231 is tightly fitted (pressed) into a surrounding wall of the fourth hole 324 of the second housing 32. This configuration results in at least both end portions of the conducting member cover 231 in the centerline direction being in contact with, and supported by, the supporting member 65 and the second housing 32. This allows to prevent an adverse effect on the conducting member 22 even in a bad vibration environment, enabling to avoid breaking of connections, bad connection and the like in the conducting member 22 due to vibrations.

The board cover 232 is a basically cylindrical section, and includes a rectangular opening 232a on its side surface that allows for installation of the printed wiring board 210 in the inside. Further, a ring groove 232b for the O-ring 24 is formed at the rear end side of the board cover 232. The O-ring 24 seals the inside of the housing 30 and the installation portion of the printed wiring board 210.

The connector 233 is a thin-walled section protruding from a rear end surface 232c of the board cover 232 and covering the periphery of the three third connecting pins 21c connected to the printed wiring board 210. The rear end portion of the connector 233 is opened so as to receive therein the connector 8a provided at the front end portion of the transmission cable 8. Further, at the rear end side of the connector 233, a hole 233a is formed that communicates the inside and the outside. Inserting a hook provided on the connector 8a of the transmission cable 8 into this hole 233a prevents the connector 8a from falling off from the connector 233.

The cover member 23 with the above configuration is made of a material having insulation property, such as resin. Further, the cover member 23 is integrally formed with the conducting member 22, the first connecting pin 21a, the second connecting pin 21b and the three third connecting pins 21c. More specifically, the cover member 23 is formed by pushing a heated resin into a mold in which the conducting member 22, the first connecting pin 21a, the second connecting pin 21b and the three third connecting pins 21c have been set.

The signal processor 200 is unitized according to the following procedure. The printed wiring board 210 of the circuit board part 21 is inserted from the opening 232a of the cover member 23 that has been formed, and the printed wiring board 210 is installed at the central part in the board cover 232. In installing the printed wiring board 210, tip ends of the first connecting pin 21a, the second connecting pin 21b and the three third connecting pins 21c are passed through respective through-holes penetrating in a thickness direction, and then soldered. Then, the first connecting pin 21a and the conducting member 22 are connected with each other using a conductor wire. The O-ring 24 is mounted on the ring groove 232b of the board cover 232 of the cover member 23. The O-ring 24 may be a well-known O-shaped ring made of a fluorine-based rubber.

(Holding Member)

Next, explanation will be given of the holding member 300.

The holding member 300 is a thin-walled cylindrical member and includes, at the rear end portion, a protrusion 300a protruding inward from the inner surface. After the holding member 300 is mounted to the second housing 32, a section corresponding to the recess 335a on the fifth outer surface 335 is pressed from the outside and thus swaged. This makes the holding member 300 hardly move with respect to the housing 30, thus preventing the signal processor 200 from moving with respect to the housing 30.

[Electrical Connection Structure of the Pressure Detection Device]

Next, explanation will be given of the electrical connection structure of the pressure detection device 5.

(Positive Path)

In the pressure detection device 5, the rear end surface (a positive electrode) of the piezoelectric element 10 is electrically connected to the second electrode 55 made of metal. The second electrode 55 is electrically connected to the coil spring 70 made of metal via the protrusion 55a. The coil spring 70 is electrically connected to the conducting member 22 made of metal. The conducting member 22 is electrically connected to a positive signal electrode of the printed wiring board 210 via the first connecting pin 21a. Hereinafter, the electrical path from the rear end surface of the piezoelectric element 10 through the conducting member 22 and the like to the positive signal electrode of the printed wiring board 210 is referred to as the "positive path".

(Negative Path)

Meanwhile, in the pressure detection device 5, the front end surface (a negative electrode) of the piezoelectric element 10 is electrically connected to the first housing 31 and the second housing 32 (the housing 30) both made of metal, via the first electrode 50 and the diaphragm head 40 both made of metal. Further, the second housing 32 is electrically connected to a negative signal electrode of the printed wiring board 210 via the second connecting pin 21b. Hereinafter, the electrical path from the front end surface of the piezoelectric element 10 through the diaphragm head 40, the housing 30 and the like to the negative signal electrode of the printed wiring board 210 is referred to as the "negative path".

(Relationship between the Positive Path and the Negative Path)

In the pressure detection device 5 of the exemplary embodiment, the negative path is present outside of the positive path. In other words, the positive path is accommodated within the negative path. Between the positive path and the negative path, the insulating ring 60, the supporting member 65 and the cover member 23, which are made of an insulating material, are arranged. As a result, the positive path and the negative path are electrically insulated from each other by the insulating ring 60, the supporting member 65, the cover member 23, and an air gap that is present in some areas between the two paths.

[Mounting of the Pressure Detection Device]

In mounting the pressure detection device 5 with the above configuration to the cylinder head 4 of the internal combustion engine 1, the pressure detection device 5 is inserted into the communication hole 4a of the cylinder head 4 with the diaphragm head 40 of the sensor part 100 first.

Mounting of the pressure detection device 5 to the cylinder head 4 is performed in a state where the first seal member 71 and a second seal member 72 are interposed between the cylinder head 4 and the pressure detection device 5. At this time, the outer surfaces of the cylindrical portion 41 and the chamfered portion 43 of the diaphragm head 40, the outer surface of the first housing 31, the first outer surface 331 and the second outer surface 332 of the second housing 32 face the inner surface of the communication hole 4a of the cylinder head 4. In the exemplary embodiment, a part of the housing unit (the housing 30 and the diaphragm head 40) of the pressure detection device 5 to be accommodated within the communication hole 4a is provided with the insulating layer 80 on its entire outer surface. Thus, in reality the insulating layer 80 faces the inner surface of the communication hole 4a. On the other hand, the fourth outer surface 334, which is not provided with the insulating layer 80, of the second housing 32 is exposed outside the cylinder head 4.

Then, in a state where the pressure detection device 5 is inserted into the cylinder head 4 of the internal combustion engine 1, the regular hexagonal prism part formed at the rear end portion of the fourth outer surface 334 of the pressure detection device 5 is fitted with a clamp (not shown in the figure). The surface of the clamp is covered with an insulator. The clamp is fixed to the cylinder head 4 with a bolt (not shown in the figure), and the pressure detection device 5 is press-fixed to the cylinder head 4 by using this clamp.

Mounting the pressure detection device 5 to the cylinder head 4 in this way ensures that the housing unit consisting of the housing 30 and the diaphragm head 40 is not electrically connected to the cylinder head 4 made of metal, and is electrically connected to the GND voltage of the controller 6 via the printed wiring board 210. Thus, by virtue of having the insulating layer 80, the pressure detection device 5 of the exemplary embodiment is electrically insulated from the cylinder head 4, which is the mounting target.

[Seal Member]

Next, explanation will be given of the seal member 7.

The seal member 7 includes the first seal member 71 arranged between an end surface of the surrounding wall of the communication hole 4a of the cylinder head 4 in a fastening direction of the pressure detection device 5 and the front end surface of the columnar portion where the fourth outer surface 334 of the housing 30 of the pressure detection device 5 is formed. The first seal member 71 is for sealing between the cylinder head 4 and the pressure detection device 5. The seal member 7 further includes the second seal member 72 arranged between the inclined portion 4c of the communication hole 4a of the cylinder head 4 and the inclined surface 315a of the first housing 31 of the housing 30 of the pressure detection device 5. The second seal member 72 is for sealing between the cylinder head 4 and the pressure detection device 5.

An example of the first seal member 71 is a gasket made of an insulator such as PTFE. The cross-sectional shape of the first seal member 71 is preferably of an S-shape or a substantially rectangular shape. When the pressure detection device 5 is fastened to the cylinder head 4, the first seal member 71 deforms by receiving force in the fastening direction so that its length in the fastening direction is shortened. This increases airtightness of the combustion chamber C. In other words, as a result of the pressure detection device 5 being screwed into the cylinder head 4, the contact pressure between the first seal member 71 and the cylinder head 4 and the contact pressure between the first seal member 71 and the housing 30 of the pressure detection device 5 increase. This prevents the combustion gas from leaking from between the first seal member 71 and the cylinder head 4 and between the first seal member 71 and the housing 30 of the pressure detection device 5. Additionally, since the seal member 71 is made of an insulator, it electrically disconnects the cylinder head 4 from the front end surface of the columnar portion where the fourth outer surface 334 of the pressure detection device 5 is formed.

An example of the second seal member 72 is an O-ring with a circular cross-section and made of stainless steel or aluminum. When the pressure detection device 5 is fastened to the cylinder head 4, the second seal member 72 deforms by receiving force from the inclined portion 4c of the communication hole 4a of the cylinder head 4 and the inclined surface 315a of the first housing 31 of the housing 30 in a direction intersecting the fastening direction. This increases airtightness of the combustion chamber C. In other words, as a result of the pressure detection device 5 being screwed into the cylinder head 4, the contact pressure between the second seal member 72 and the inclined part 4c of the communication hole 4a of the cylinder head 4 and the contact pressure between the second seal member 72 and the inclined surface 315a of the first housing 31 of the housing 30 increase. This prevents the combustion gas from leaking from between the second seal member 72 and the cylinder head 4 and between the second seal member 72 and the housing 30 of the pressure detection device 5.

[Method for Manufacturing the Pressure Detection Device]

Figure 7:
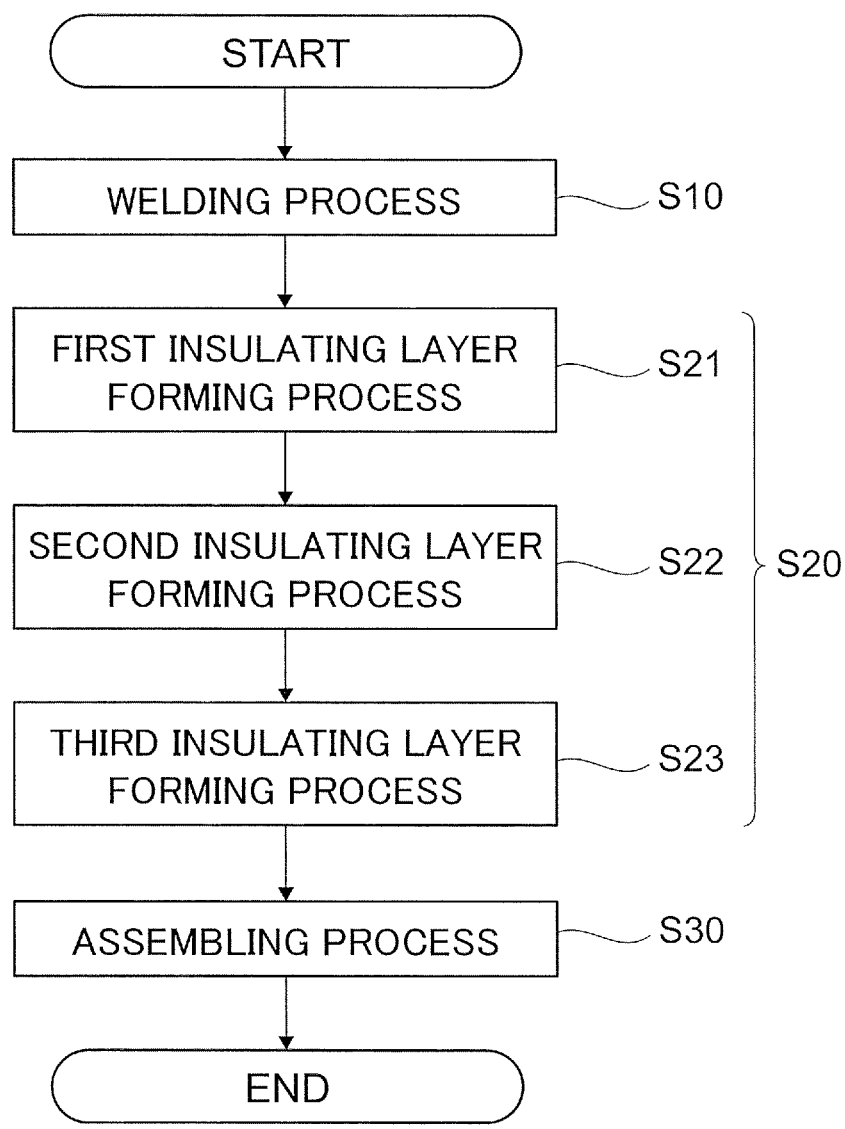
FIG. 7 is a flowchart for explaining the method for manufacturing the pressure detection device.

FIG. 7 is a flowchart for explaining the method for manufacturing the pressure detection device 5.

First, a welding process is performed (Step 10) in which the first housing 31 and the diaphragm head 40 are welded to each other and the first housing 31 and the second housing 32 are welded to each other. More specifically, the front end of the first housing 31 is first inserted (pressed) into the diaphragm head 40 from the rear end of the diaphragm head 40. Then, a portion (on the outer surface) where the rear end of the diaphragm head 40 and the front end of the first housing 31 contact each other is irradiated with laser beam in a direction intersecting the centerline direction (e.g. a direction perpendicular to the centerline direction) to weld (join) the diaphragm head 40 and the first housing 31. Subsequently, the front end of the second housing 32 is inserted (pressed) into the first housing 31 from the rear end of the first housing 31. Then, a portion (on the outer surface) where the rear end of the first housing 31 and the front end of the second housing 32 contact each other is irradiated with laser beam in a direction intersecting the centerline direction (e.g. a direction perpendicular to the centerline direction) to weld (join) the first housing 31 and the second housing 32. Thus, the housing unit is obtained that have integrated the diaphragm head 40, the first housing 31, and the second housing 32. It should be noted that the order of laser welding may be reversed in Step 10. Also, any other welding method than the laser welding is applicable to Step 10.

Then, an insulating layer forming process is performed (Step 20) in which the insulating layer 80 is formed on the outer surface of the housing unit that has been obtained in Step 10. To obtain the three-layered insulating layer 80, the insulating layer forming process of the exemplary embodiment performs a first insulating layer forming process to form the first insulating layer 81 (Step 21), then a second insulating layer forming process to form the second insulating layer 82 (Step 22), and finally a third insulating layer forming process to form the third insulating layer 83 (Step 23). The insulating layer forming process of the exemplary embodiment does not form the insulating layer 80 on the fourth outer surface 334 and the fifth outer surface 335 of the second housing 32, among the outer surface of the housing unit. To form the insulating layer 80, the exemplary embodiment uses an aerosol deposition (AD) method, which transports fine powders (raw material particles) of the dried raw material (ceramics in this specific example) in a solid state by a gas (carrier gas), and injects the powders from a nozzle to collide them with a target (the housing unit in this specific example), thus allowing for a high-speed thick film coating at low temperature. Details of the film formation by the AD method will be described later.

Subsequently, an assembling process is performed (Step 30) in which various components constituting the pressure detection device 5, such as the piezoelectric element 10, are assembled into the housing unit, whose outer surface has been provided with the insulating layer 80 in Step 20, from the rear end of the housing unit. Through the above processes, the pressure detection device 5 is obtained.

[Film deposition Apparatus]

Figure 8:
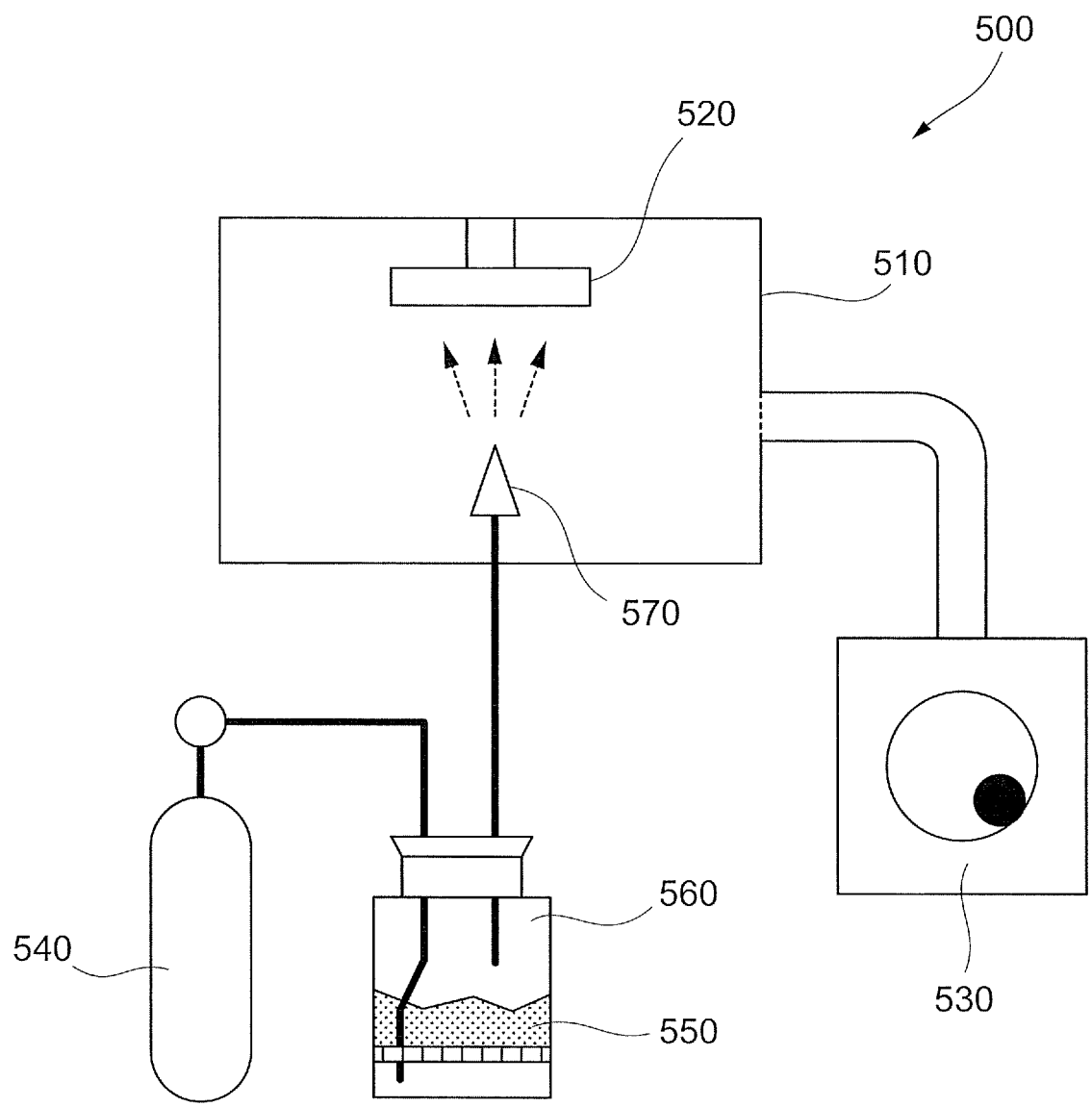
FIG. 8 illustrates a schematic configuration of a film deposition apparatus used for forming an insulating layer.

FIG. 8 illustrates a schematic configuration of a film deposition apparatus 500 used for forming the insulating layer 80.

The film deposition apparatus 500 includes a chamber 510, a pedestal 520, and a rotary pump 530. The chamber 510 accommodates the housing unit, which is the target on which the film is to be formed. The pedestal 520 is disposed inside the chamber 510, and the housing unit is mounted to this pedestal 520. The rotary pump 530 is connected to the chamber 510 to depressurize the chamber 510. The film deposition apparatus 500 further includes a gas cylinder 540, an aerosol generator 560, and a nozzle 570. The gas cylinder 540 supplies a carrier gas. The aerosol generator 560 contains raw material particles 550 (stabilized zirconia particles in this specific example) and aerosolizes the particles 550 with the carrier gas supplied from the gas cylinder 540. The nozzle 570 is disposed inside the chamber 510, and injects the aerosolized raw material particles 550 supplied from the aerosol generator 560, onto the housing unit mounted to the pedestal 520.

In the film deposition apparatus 500 of the exemplary embodiment, the pedestal 520 is movable in all directions inside the chamber 510. Accordingly, the pedestal 520 can oppose the housing unit mounted to the pedestal 520 obliquely to the nozzle 570 for example, in addition to opposing the housing unit directly in front of the nozzle 570.

Further, in the exemplary embodiment, various adjustments are made such as to the particle size of the raw material particles 500 used for the film deposition apparatus 500, the spray speed of the carrier gas and the raw material particles 500 from the nozzle 570, thereby forming the first insulating layer 81, the second insulating layer 82, and the third insulating layers 81 each having different characteristics.

It should be noted that although the present exemplary embodiment uses the above AD method to form the insulating layer 80 of the pressure detection device 5, the method for forming the insulating layer 80 is not limited to this. Examples of other methods for forming the insulating layer 80 include various physical vapor deposition (PVD) methods, various chemical vapor deposition (CVD) methods, and various coating methods (spin coating, dip coating, spray coating, etc.)

[Pressure Detection Operation of the Pressure Detection Device]

Next, explanation will be given of the operation of the pressure detection device 5 to detect pressure of the internal combustion engine 1.

When the internal combustion engine 1 is in operation, pressure of the combustion gas generated in the combustion chamber C (i.e. the combustion pressure) is applied to the front end (surface) of the closing portion 42 of the diaphragm head 40. In the diaphragm head 40, the pressure received by the front surface recess 421 is transmitted to the rear surface protrusion 422, then acting on the piezoelectric element 10 interposed between the first electrode 50 and the second electrode 55. This causes the piezoelectric element 10 to generate electric charges corresponding to the combustion pressure. The electric charges generated in the piezoelectric element 10 are then supplied to the circuit board part 21 via the second electrode 55, the coil spring 70, and the conducting member 22. The electric charges supplied to the circuit board part 21 are subjected to amplification processing by the circuit board part 21, and the voltage corresponding to the electric charges is supplied to the controller 6 via the third connecting pins 21c connected to the circuit board part 21 and via the transmission cable 8.

[Advantageous Effects of the Exemplary Embodiment]

The pressure detection device 5 of the exemplary embodiment is mounted to the internal combustion engine 1 (more specifically to the cylinder head 4). In a case where this internal combustion engine 1 is installed in a vehicle, a noise generated outside the internal combustion engine 1 enters the cylinder head 4 of the internal combustion engine 1.

In the exemplary embodiment, the housing unit (the housing 30 and the diaphragm head 40) of the pressure detection device 5 is provided with the insulating layer 80 on a part of its outer surface facing the inner surface of the communication hole 4a of the cylinder head 4. Accordingly, in the exemplary embodiment, the negative path in the pressure detection device 5 is electrically insulated from the cylinder head 4 of the internal combustion engine 1. This insulating layer 80 hinders the noise having entered the cylinder 4 from propagating to the printed wiring board 210 via the housing unit of the pressure detection device 5. This minimizes oscillation (fluctuation) of the potential in the printed wiring board 210 due to the noise, enabling to reduce oscillation (fluctuation) of output signals fed from the printed wiring board 210 to the outside (e.g. the controller 6).

During the above described pressure detection operation of the pressure detection device 5 of the exemplary embodiment, the diaphragm head 40 is exposed to, and heated by, the high temperature combustion gas, and expands due to the heat. If the cylindrical portion 41 of the diaphragm head 40 extends in an axial direction due to this thermal expansion, it reduces the preload that is applied to the piezoelectric element 10 via the diaphragm head 40, the first electrode 50, the second electrode 55 and the like. Then, if the next combustion takes place in the chamber C prior to termination of the thermal expansion, namely prior to contraction of the diaphragm head 40, the output value from the pressure detection device 5 becomes lower than the proper output value, due to the decrease in the preload.

In the exemplary embodiment, the outer surfaces of the diaphragm head 40 and the front end side of the housing 30 of the pressure detection device 5 are continuously covered with the insulating layer 80 that has a lower thermal conductivity than that of the metal materials of the diaphragm head 40 and the housing 30. With the insulating layer 80, less heat of the combustion gas generated in the combustion chamber C is transmitted to the diaphragm head 40 and the housing 30 than in the case without the insulating layer 80. Further, since the insulating layer 80 is continuously provided, localized heating of the outer surface of the diaphragm head 40 or the housing 30 is less likely to occur. This makes thermal expansion of the cylindrical portion 41 of the diaphragm head 40 due to the heat of the combustion gas less likely to occur. As a result, fluctuation of the preload applied to the piezoelectric element 10 by the diaphragm head 40 and the like is prevented, which in turn prevents fluctuation of the output value from the pressure detection device 5.

[Other Matters]

Although the above explanation of the exemplary embodiment has been given using a case where the pressure detection device 5 uses the piezoelectric element 10 as a pressure detection element, the pressure detection element is not limited to this. For example, a strain gauge or a separated electrode may be used.

EXAMPLES

Hereinafter, the present invention will be described in more detail using the examples. It should be noted that the present invention is not limited to the following examples; other modifications may be made without departing from the gist of the invention.

The inventors produced multiple pressure detection devices 5 each with or without the insulating layer 80, whose structure is further differentiated for each pressure detection device 5, provided on the housing unit. The inventors evaluated these pressure detection devices 5 by an antenna irradiation test and a heating simulation test.

Tables 1 and 2 show the structures of the insulating layers 80 used in the examples (Examples 1-20) and the comparative example, and their evaluation results. Note that the pressure detection device 5 explained in the above exemplary embodiment corresponds to Example 16 shown in Table 2.

TABLE 1

| EXAMPLE/ COMPARATIVE EXAMPLE | INSULATING LAYER | NO. OF LAYERS | FIRST INSULATING LAYER | | | SECOND INSULATING LAYER | | | THIRD INSULATING LAYER | | | ANTENNA IRRADIATION TEST RESULT |
|---|---|---|---|---|---|---|---|---|---|---|---|---|
| | | | MATERIAL | METHOD | THICKNESS (µm) | MATERIAL | METHOD | THICKNESS (µm) | MATERIAL | METHOD | THICKNESS (µm) | MAXIMUM VARIATION (mV) |
| EXAMPLE 1 | PRESENT | 1 | ZrO2 (NON-DENSE) | AD | 80 | | | | | | | 24 |
| EXAMPLE 2 | PRESENT | 1 | ZrO2 (NON-DENSE) | AD | 55 | | | | | | | 26 |
| EXAMPLE 3 | PRESENT | 1 | ZrO2 (NON-DENSE) | AD | 40 | | | | | | | 24 |
| EXAMPLE 4 | PRESENT | 1 | ZrO2 (NON-DENSE) | AD | 8.0 | | | | | | | 33 |
| EXAMPLE 5 | PRESENT | 1 | ZrO2 (NON-DENSE) | AD | 5.0 | | | | | | | 27 |
| EXAMPLE 6 | PRESENT | 1 | ZrO2 (NON-DENSE) | AD | 2.3 | | | | | | | 34 |
| EXAMPLE 7 | PRESENT | 1 | ZrO2 (NON-DENSE) | AD | 1.2 | | | | | | | 20 |
| EXAMPLE 8 | PRESENT | 1 | ZrO2 (DENSE) | AD | 10 | | | | | | | 26 |
| EXAMPLE 9 | PRESENT | 1 | ZrO2 (DENSE) | AD | 1.8 | | | | | | | 23 |
| EXAMPLE 10 | PRESENT | 1 | ZrO2 (DENSE) | AD | 1.0 | | | | | | | 21 |

TABLE 2

| EXAMPLE/ COMPARATIVE EXAMPLE | INSULATING LAYER | NO. OF LAYERS | FIRST INSULATING LAYER | | | SECOND INSULATING LAYER | | | THIRD INSULATING LAYER | | | ANTENNA IRRADIATION TEST RESULT |
|---|---|---|---|---|---|---|---|---|---|---|---|---|
| | | | MATERIAL | METHOD | THICKNESS (µm) | MATERIAL | METHOD | THICKNESS (µm) | MATERIAL | METHOD | THICKNESS (µm) | MAXIMUM VARIATION (mV) |
| EXAMPLE 11 | PRESENT | 2 | ZrO2 (DENSE) | AD | 1.0 | ZrO2 (NON-DENSE) | AD | 30 | | | | 22 |

TABLE 2-continued

| EXAMPLE/ COMPARATIVE EXAMPLE | INSULATING LAYER | NO. OF LAYERS | FIRST INSULATING LAYER | | | SECOND INSULATING LAYER | | | THIRD INSULATING LAYER | | | ANTENNA IRRADIATION TEST RESULT |
|---|---|---|---|---|---|---|---|---|---|---|---|---|
| | | | MATERIAL | METHOD | THICKNESS (μm) | MATERIAL | METHOD | THICKNESS (μm) | MATERIAL | METHOD | THICKNESS (μm) | MAXIMUM VARIATION (mV) |
| EXAMPLE 12 | PRESENT | 2 | ZrO2 (DENSE) | AD | 1.0 | ZrO2 (NON-DENSE) | AD | 17.5 | | | | 21 |
| EXAMPLE 13 | PRESENT | 2 | ZrO2 (DENSE) | AD | 1.0 | ZrO2 (NON-DENSE) | AD | 10 | | | | 22 |
| EXAMPLE 14 | PRESENT | 2 | ZrO2 (DENSE) | AD | 1.0 | ZrO2 (NON-DENSE) | AD | 4.5 | | | | 23 |
| EXAMPLE 15 | PRESENT | 2 | ZrO2 (DENSE) | AD | 12.2 | ZrO2 (NON-DENSE) | AD | 13.1 | | | | 23 |
| EXAMPLE 16 | PRESENT | 3 | ZrO2 (DENSE) | AD | 11.6 | ZrO2 (NON-DENSE) | AD | 14 | ZrO2 (DENSE) | AD | 8.9 | 24 |
| EXAMPLE 17 | PRESENT | 1 | SiO2 | CVD | 5.0 | | | | | | | 23 |
| EXAMPLE 18 | PRESENT | 1 | SiO2 | CVD | 1.0 | | | | | | | 22 |
| EXAMPLE 19 | PRESENT | 1 | PI | SC | 2.0 | | | | | | | 22 |
| EXAMPLE 20 | PRESENT | 1 | DLC | PVDCVD | 1.0 | | | | | | | 36 |
| COMPARATIVE EXAMPLE | ABSENT | | | | | | | | | | | 190 |

[Structures in the examples and the Comparative Example]

Explanation will be given of the structures in the examples (Examples 1-20) and the comparative example.

Examples 1-10 shown in Table 1 use the insulating layer 80 consisting of a single layer (only the first insulating layer 81 is present) made of $ZrO_2$ (in reality, stabilized zirconia with a yttrium oxide added; the same applies to the following explanation). The first insulating layer 81 of Examples 1-7 is a non-dense layer with a higher porosity than the first insulating layer 81 of Examples 8-10. The first insulating layer 81 of Examples 8-10 is a dense layer with a lower porosity than the first insulating layer 81 of Examples 1-7. Hereinafter, in the following examples, a layer with the porosity comparable to that of the first insulating layer 81 of Examples 1-7 is referred to as being "non-dense", and a layer with the porosity comparable to that of the first insulating layer 81 of Examples 8-10 is referred to as being "dense".

Additionally, Examples 1-10 use the AD method to produce the first insulating layer 81. The film thickness of the first insulating layer 81 is as follows: Example 1: 80 μm; Example 2: 55 μm; Example 3: 40 μm; Example 4: 8.0 μm; Example 5: 5.0 μm; Example 6: 2.3 μm; Example 7: 1.2 μm; Example 8: 10 μm; Example 9: 1.8 μm; and Example 10: 1.0 μm.

Examples 11-15 shown in Table 2 use the insulating layer 80 consisting of two layers (the first insulating layer 81 and the second insulating layer 82 are present) respectively made of $ZrO_2$ (dense) and $ZrO_2$ (non-dense). Additionally, Examples 11-15 use the AD method to produce both the first insulating layer 81 and the second insulating layer 82. The film thickness of the first insulating layer 81 is as follows: Examples 11-14: 1.0 μm; and Example 15: 12.2 μm. The film thickness of the second insulating layer 82 is as follows: Example 11: 30 μm; Example 12: 17.5 μm; Example 13: 10 μm; Example 14: 4.5 μm; and Example 15: 13.1 μm.

Example 16 shown in Table 2 uses the insulating layer 80 consisting of three layers (the first insulating layer 81, the second insulating layer 82, and the third insulating layer 83 are present) respectively made of $ZrO_2$ (dense), $ZrO_2$ (non-dense), and $ZrO_2$ (dense). Additionally, Example 16 uses the AD method to produce all of the first insulating layer 81, the second insulating layer 82, and the third insulating layer 83. In Example 16, the film thickness of the first insulating layer 81, the second insulating layer 82, and the third insulating layer 83 is 11.6 μm, 14 μm, and 8.9 μm, respectively.

Examples 17 and 18 shown in Table 2 use the insulating layer 80 consisting of a single layer (only the first insulating layer 81 is present) made of $SiO_2$. Additionally, Examples 17 and 18 use a CVD method (more specifically a plasma CVD method) to produce the first insulating layer 81. The film thickness of the first insulating layer 81 of Examples 17 and 18 is 5.0 μm and 1.0 μm, respectively.

Example 19 shown in Table 2 uses the insulating layer 80 consisting of a single layer (only the first insulating layer 81 is present) made of polyimide (PI). Additionally, Example 19 uses a spin coating (SC) method to produce the first insulating layer 81. In Example 19, the film thickness of the first insulating layer 81 is 2.0 μm.

Example 20 shown in Table 2 uses the insulating layer 80 consisting of a single layer (only the first insulating layer 81 is present) made of diamond-like carbon (DLC). Additionally, Example 20 uses a combined method of a PVD method and a CVD method (more specifically a plasma CVD method) to produce the first insulating layer 81. In Example 20, the film thickness of the first insulating layer 81 is 1.0 μm.

On the other hand, the comparative example shown in Table 2 does not have the insulating layer 80, leaving the metal exposed on the entire outer surface of the housing unit.

[Antenna Irradiation Test]

First, brief explanation will be given of the antenna irradiation test used for evaluating the pressure detection device 5.

The antenna irradiation test is a test specified by electromagnetic compatibility (EMC) standards for vehicles, for example by ISO11452-2:2014. Here, the antenna irradiation test was conducted in a state where the second outer surface 332 of the pressure detection device 5 of each of the examples and the comparative example was grounded with copper tape. In other words, the antenna irradiation test was conducted supposing that the pressure detection device 5 was mounted to (inserted into) the grounded cylinder head 4. In the test, the noise applied to the pressure detection device 5 was set within the range of 1000 kHz (1 MHz) to 2000 kHz (2 MHz). The inventors measured the amount of variation in the output voltage (hereinafter referred to as the "output voltage variation") from the printed wiring board 210 of the pressure detection device 5, while changing the frequency of the noise.

FIGS. 9A-11G show the results of the antenna irradiation test. FIGS. 9A-9G show the results of Examples 1-7. FIGS. 10A-10G show the results of Examples 8-14. FIGS. 11A-11G show the results of Examples 15-20 and the comparative example. In each figure, the horizontal axis indicates the frequency of the noise, and the vertical axis indicates the output voltage variation. Note that the above Tables 1 and 2 show the maximum value of the output voltage variation (hereinafter referred to as the "maximum variation") in each of the examples and the comparative example.

In each of the examples (Examples 1-20), the maximum variation in the antenna irradiation test was less than 40 mV. On the other hand, the maximum variation of the comparative example was 190 mV, an order of magnitude higher than Examples 1-20. Therefore, the test demonstrated that the pressure detection device 5 with the insulating layer 80 has a higher resistance to the noise from the outside than the pressure detection device 5 without the insulating layer 80.

In the examples, films made of $ZrO_2$, $SiO_2$, PI, and DLC were evaluated as an example of the insulating layer 80. A $ZrO_2$ film and an $SiO_2$ film, when used as the insulating layer 80, can maintain a good electrical insulation between the pressure detection device 5 and the cylinder head 4 because these films have excellent insulating characteristics with a direct-current insulation resistance of $10^{12}$ ohm or more. In particular, an $ZrO_2$ film has a linear expansion coefficient comparable to that of a metal material for the housing unit, such as stainless steel, and thus is resistant to breakage or separation of the insulating layer 80 caused by the difference in linear expansion coefficients between the housing unit and the insulating layer 80. For this reason, an $ZrO_2$ film can be effectively used in an environment with severe temperature changes. A PI film and a DLC film, when used as the insulating layer 80, have a higher adhesiveness to the housing unit than a film made of an oxide, and are thus less susceptible to failures such as separation of the insulating layer 80. In particular, a DLC film, which has a very high adhesiveness and a high film strength, is resistant to abrasions and the like and can be reliably used in a wide range of environments.

Further, by being composed of multiple layers each with a different porosity, the insulating layer 80 can be resistant to noises in a wide range of frequencies. This utilizes characteristics that the insulating layer 80 can have a different permittivity depending on the difference in porosity. An insulating layer 80 with a high porosity has a lower permittivity than an insulating layer 80 with a low porosity, and thus use of such an insulating layer 80 with a high porosity can make the insulating layer 80 less transmissive to high frequency noises. On the other hand, an insulating layer 80 with a low porosity has a higher permittivity than an insulating layer 80 with a high porosity, and thus use of such an insulating layer 80 with a low porosity can make the insulating layer 80 less transmissive to low frequency noises. Therefore, with the multi-layered structure of stacked insulating films each having a different porosity, the insulating layer 80 can be resistant to noises in a wide range of frequencies.

In composing the insulating layer 80 of multiple layers, the first insulating layer 81 of the insulating layer 80, which directly contacts the housing unit, is preferably a film with a low porosity. Such a film with a low porosity has a higher adhesiveness than an insulating film with a high porosity, allowing for increased adhesion between the housing unit and the insulating layer 80. Further, the outermost surface layer of the insulating layer 80 is preferably a film with a low porosity. Such a film with a low porosity has a higher film strength than an insulating layer with a high porosity, allowing the insulating layer 80 to be resistant to abrasions and the like.

Further, for the pressure detection device 5 of the present invention, materials of the insulating layer 80 and the housing unit are chosen such that the thermal conductivity of the insulating layer 80 is lower than that of the housing unit. The thermal conductivity of stainless steel, which constitutes the housing unit, is 16-27 W/m·k while the thermal conductivity of the insulating layer 80 of the above examples is 2-3 W/m·k in the case of a $ZrO_2$ film, 1.38 W/m·k in the case of an $SiO_2$ film, 0.18 W/m·k in the case of a PI film, and 0.2-30 W/m·k (representative value: 15 W/m·k) in the case of a DLC film. Therefore, the pressure detection device 5 with the insulating layer 80 can prevent the temperature rise due to heat from the outside and the resultant thermal expansion, as compared with the pressure detection device 5 without the insulating layer 80.

Methods for forming the insulating layer 80 of the above examples include, for example, various PVD methods, various CVD methods, and various coating methods (spin coating, dip coating, spray coating, etc.) In particular, the AD method allows for easy formation of stacked films and easy control of porosities of the films, enabling to easily obtain the insulating layer 80 with desired characteristics. Moreover, since the AD method allows for film formation at room temperature, the method hardly causes thermal strain or thermal stress in the housing unit during the film formation, thus allowing to provide the pressure detection device 5 with minimized errors in output values.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A pressure detection device comprising:
  a cylindrical body made of a conductor;
  a pressure receiver made of a conductor, the pressure receiver being mounted to one end side of the body, the pressure receiver including a cylindrical portion contacting with the one end side of the body and a closing portion and receiving pressure from the outside;

a signal generator arranged inside the body, the signal generator being electrically connected to the pressure receiver and generating a signal corresponding to the pressure received by the pressure receiver; and a cover made of an insulator layer with a lower thermal conductivity than thermal conductivities of the body and the pressure receiver, the cover continuously being arranged on an entire outer surface of the cylindrical portion, and a portion of an outer surface of the body, the portion being located at a side closer to the pressure receiver.

2. The pressure detection device according to claim 1, wherein the cover includes a first cover layer and a second cover layer, the first cover layer being arranged on the body and the pressure receiver, the second cover layer being arranged on the first cover layer and having a higher porosity than a porosity of the first cover layer.

3. The pressure detection device according to claim 2, wherein the cover further includes a third cover layer arranged on the second cover layer, the third cover layer having a lower porosity than the porosity of the second cover layer.

4. An internal combustion engine equipped with a pressure detection device, comprising:
a cylinder head having a communication hole, the communication hole communicating a combustion chamber with the outside of the combustion chamber, the combustion chamber being located at one end side, the outside of the combustion chamber being located at the other end side; and
a pressure detection device inserted into the communication hole to be mounted to the cylinder head, the pressure detection device detecting pressure inside the combustion chamber, wherein
the pressure detection device includes:
a cylindrical body made of a conductor, the body being arranged so as to be present inside and outside of the communication hole;
a pressure receiver made of a conductor, the pressure receiver being mounted to the one end side of the body, the pressure receiver including a cylindrical portion contacting with the one end side of the body and a closing portion receiving pressure from the combustion chamber;
a signal generator arranged inside the body, the signal generator being electrically connected to the pressure receiver and generating a signal corresponding to the pressure received by the pressure receiver; and
a cover made of an insulator layer with a lower thermal conductivity than thermal conductivities of the body and the pressure receiver, the cover continuously being arranged on an entire outer surface of the cylindrical portion, and a portion of an outer surface of the body, the portion being located inside the communication hole.

5. A method for manufacturing a pressure detection device comprising:

mounting a pressure receiver to one end side of an cylindrical body so as to electrically connect the pressure receiver and the body, the pressure receiver and the body each being made of a conductor, the pressure receiver including a cylindrical portion contacting with the one end side of the body and a closing portion receiving pressure from the outside;

forming a cover so as to be continuously arranged on an entirety of an outer surface of the cylindrical portion, and a portion of an outer surface of the body, the portion being located at a side closer to the pressure receiver, by an aerosol deposition method, the cover being an inorganic insulator layer; and mounting a signal generator inside the body so as to electrically connect the signal generator and the pressure receiver, the signal generator generating a signal corresponding to the pressure received by the pressure receiver.

6. The pressure detection device according to claim 1, wherein the pressure receiver comprises a diaphragm head.

7. The pressure detection device according to claim 6, wherein the diaphragm head includes the cylindrical portion having a cylindrical shape, the closing portion having a plate shape that is arranged at a front end of the cylindrical portion to close the front end of the cylindrical portion, and a chamfered portion at an outer surface at a corner of the cylindrical portion and the closing portion.

8. The internal combustion engine according to claim 4, wherein the cover includes a first cover layer and a second cover layer, the first cover layer being arranged on the body and the pressure receiver, the second cover layer being arranged on the first cover layer and having a higher porosity than a porosity of the first cover layer.

9. The internal combustion engine according to claim 8, wherein the cover further includes a third cover layer arranged on the second cover layer, the third cover layer having a lower porosity than the porosity of the second cover layer.

10. The internal combustion engine according to claim 4, wherein the pressure receiver comprises a diaphragm head.

11. The internal combustion engine according to claim 10, wherein the diaphragm head includes the cylindrical portion having a cylindrical shape, a closing portion having a plate shape that is arranged at a front end of the cylindrical portion to close the front end of the cylindrical portion, and a chamfered portion at an outer surface at a corner of the cylindrical portion and the closing portion.

12. The pressure detection device according to claim 1, wherein the cover further continuously covers at least a part of the closing portion.

13. The internal combustion engine according to claim 4, wherein the cover further continuously covers at least a part of the closing portion.

14. The method according to claim 5, wherein the cover further continuously covers at least a part of the closing portion.

* * * * *